US009081542B2

(12) United States Patent
Dickinson et al.

(10) Patent No.: US 9,081,542 B2
(45) Date of Patent: Jul. 14, 2015

(54) SYSTEMS AND METHODS FOR A WEARABLE TOUCH-SENSITIVE DEVICE

(75) Inventors: Timothy Dickinson, Crystal Lake, IL (US); Rachid M. Alameh, Crystal Lake, IL (US)

(73) Assignee: Google Technology Holdings LLC, Mountian View, CA (US)

( * ) Notice: Subject to any disclaimer, the term of this patent is extended or adjusted under 35 U.S.C. 154(b) by 177 days.

(21) Appl. No.: 13/596,450

(22) Filed: Aug. 28, 2012

(65) Prior Publication Data

US 2014/0062892 A1    Mar. 6, 2014

(51) Int. Cl.
*G06F 3/041* (2006.01)
*G06F 1/16* (2006.01)
*G06F 3/0354* (2013.01)

(52) U.S. Cl.
CPC .............. *G06F 1/163* (2013.01); *G06F 1/1643* (2013.01); *G06F 1/1652* (2013.01); *G06F 3/03547* (2013.01); *G06F 3/041* (2013.01); *G06F 2203/0339* (2013.01)

(58) Field of Classification Search
None
See application file for complete search history.

(56) References Cited

U.S. PATENT DOCUMENTS

| 4,076,262 | A |   | 2/1978  | Deventer |
|-----------|---|---|---------|---------------------|
| 5,128,671 | A |   | 7/1992  | Thomas, Jr.         |
| 5,494,447 | A |   | 2/1996  | Zaidan              |
| 5,543,588 | A |   | 8/1996  | Bisset et al.       |
| 5,610,971 | A |   | 3/1997  | Vandivier           |
| 5,623,280 | A |   | 4/1997  | Akins et al.        |
| 5,729,219 | A |   | 3/1998  | Armstrong et al.    |
| 5,795,300 | A | * | 8/1998  | Bryars ........................... 600/500 |
| 5,832,296 | A | * | 11/1998 | Wang et al. .............. 340/539.22 |
| 5,896,575 | A |   | 4/1999  | Higginbotham et al. |
| 5,898,600 | A |   | 4/1999  | Isashi              |
| 5,959,260 | A |   | 9/1999  | Hoghooghi et al.    |

(Continued)

FOREIGN PATENT DOCUMENTS

| EP | 1 335 567 A1 | 8/2003 |
|----|--------------|--------|
| EP | 1 408 400 A2 | 4/2004 |

(Continued)

OTHER PUBLICATIONS

United States Patent and Trademark Office, "Non-Final Office Action" for U.S. Appl. No. 12/565,200, Sep. 18, 2012, 22 pages.

(Continued)

*Primary Examiner* — Seokyun Moon
*Assistant Examiner* — Josemarie G Acha, III
(74) *Attorney, Agent, or Firm* — Shumaker & Sieffert, P.A.

(57) ABSTRACT

Systems and methods are provided for controlling functions associated with a touch-sensitive device (100) capable of being worn by a user. The touch-sensitive device (100) includes a substrate (110) with an outside surface (112) and an inside surface (114) opposite from the outside surface (112). A first contact sensing component (120) generates a first signal upon detection of a first contact with the outside surface (112), and a second contact sensing component (130) generates a second signal upon detection of a second contact with the inside surface (114). A processor (140) may be configured to interface with the first contact sensing component (120) and the second contact sensing component (130) and perform operations including: analyzing the first signal and the second signal to determine that a predetermined condition is satisfied, and in response to the analyzing, initiating a function associated with the predetermined condition.

23 Claims, 11 Drawing Sheets

(56) References Cited

U.S. PATENT DOCUMENTS

| | | | |
|---|---|---|---|
| 6,020,878 A | 2/2000 | Robinson | |
| 6,201,554 B1 | 3/2001 | Lands | |
| 6,233,138 B1 | 5/2001 | Osgood | |
| 6,392,870 B1 | 5/2002 | Miller, Jr. | |
| 6,457,547 B2 | 10/2002 | Novitschitsch | |
| 6,466,198 B1 | 10/2002 | Feinstein | |
| 6,504,530 B1 | 1/2003 | Wilson et al. | |
| 6,532,147 B1 | 3/2003 | Christ, Jr. | |
| 6,549,789 B1 | 4/2003 | Kfoury | |
| 6,597,347 B1 | 7/2003 | Yasutake | |
| 6,927,747 B2 | 8/2005 | Amirzadeh et al. | |
| 7,058,433 B2 | 6/2006 | Carpenter | |
| 7,075,513 B2 | 7/2006 | Silfverberg et al. | |
| 7,205,959 B2 | 4/2007 | Henriksson | |
| 7,218,313 B2 | 5/2007 | Marcus et al. | |
| 7,423,526 B2* | 9/2008 | Despotis | 340/539.12 |
| 7,453,442 B1 | 11/2008 | Poynter | |
| 7,453,443 B2 | 11/2008 | Rytivaara et al. | |
| 8,265,717 B2 | 9/2012 | Gorsica et al. | |
| 8,669,863 B2* | 3/2014 | Alhuwaishel | 340/539.11 |
| 2001/0052122 A1 | 12/2001 | Nanos et al. | |
| 2003/0103324 A1 | 6/2003 | Gallivan | |
| 2003/0197678 A1 | 10/2003 | Siddeeq | |
| 2003/0199290 A1 | 10/2003 | Viertola | |
| 2003/0234768 A1 | 12/2003 | Rekimoto et al. | |
| 2004/0192260 A1* | 9/2004 | Sugimoto et al. | 455/412.1 |
| 2004/0212599 A1* | 10/2004 | Cok et al. | 345/173 |
| 2005/0012723 A1 | 1/2005 | Pallakoff | |
| 2005/0020325 A1 | 1/2005 | Enger et al. | |
| 2005/0024339 A1 | 2/2005 | Yamazaki et al. | |
| 2005/0031390 A1 | 2/2005 | Orozco-Abundis | |
| 2005/0096106 A1 | 5/2005 | Bennetts et al. | |
| 2005/0124395 A1 | 6/2005 | Bae et al. | |
| 2005/0275416 A1 | 12/2005 | Hervieux et al. | |
| 2005/0282596 A1 | 12/2005 | Park et al. | |
| 2006/0017711 A1 | 1/2006 | Pihlaja | |
| 2006/0024601 A1 | 2/2006 | Ogawa et al. | |
| 2006/0034601 A1 | 2/2006 | Andersson et al. | |
| 2006/0037175 A1 | 2/2006 | Hyun | |
| 2006/0084482 A1 | 4/2006 | Saila | |
| 2006/0092355 A1 | 5/2006 | Yang et al. | |
| 2006/0111160 A1 | 5/2006 | Lin et al. | |
| 2006/0139320 A1* | 6/2006 | Lang | 345/156 |
| 2006/0170649 A1* | 8/2006 | Kosugi et al. | 345/156 |
| 2006/0197750 A1 | 9/2006 | Kerr et al. | |
| 2006/0284853 A1 | 12/2006 | Shapiro | |
| 2007/0075915 A1 | 4/2007 | Cheon et al. | |
| 2007/0076861 A1 | 4/2007 | Ju | |
| 2007/0097151 A1 | 5/2007 | Rosenberg | |
| 2007/0103454 A1 | 5/2007 | Elias | |
| 2007/0127199 A1 | 6/2007 | Arneson | |
| 2007/0177803 A1 | 8/2007 | Elias et al. | |
| 2008/0004085 A1 | 1/2008 | Jung et al. | |
| 2008/0102888 A1 | 5/2008 | Sellgren et al. | |
| 2008/0150903 A1* | 6/2008 | Chuang | 345/173 |
| 2008/0192977 A1 | 8/2008 | Gruenhagen et al. | |
| 2008/0211783 A1 | 9/2008 | Hotelling et al. | |
| 2008/0252608 A1* | 10/2008 | Geaghan | 345/173 |
| 2008/0261661 A1 | 10/2008 | Jessop | |
| 2008/0266118 A1* | 10/2008 | Pierson et al. | 340/573.6 |
| 2009/0046110 A1 | 2/2009 | Sadler et al. | |
| 2009/0061948 A1 | 3/2009 | Lee et al. | |
| 2009/0066660 A1 | 3/2009 | Ure | |
| 2009/0096749 A1 | 4/2009 | Kawahara et al. | |
| 2009/0131117 A1 | 5/2009 | Choi | |
| 2009/0140863 A1 | 6/2009 | Liu et al. | |
| 2009/0199130 A1* | 8/2009 | Tsern et al. | 715/810 |
| 2009/0201253 A1 | 8/2009 | Jason et al. | |
| 2009/0241048 A1 | 9/2009 | Augustine et al. | |
| 2009/0251419 A1* | 10/2009 | Radely-Smith | 345/169 |
| 2009/0273571 A1* | 11/2009 | Bowens | 345/173 |
| 2009/0298547 A1 | 12/2009 | Kim et al. | |
| 2009/0315834 A1 | 12/2009 | Nurmi et al. | |
| 2010/0007603 A1 | 1/2010 | Kirkup | |
| 2010/0029327 A1* | 2/2010 | Jee | 455/556.1 |
| 2010/0110495 A1 | 5/2010 | Letocha et al. | |
| 2010/0113100 A1 | 5/2010 | Harmon et al. | |
| 2010/0134409 A1 | 6/2010 | Challener et al. | |
| 2010/0219943 A1* | 9/2010 | Vanska et al. | 340/407.1 |
| 2010/0235742 A1* | 9/2010 | Hsu et al. | 715/716 |
| 2010/0277420 A1 | 11/2010 | Charlier et al. | |
| 2010/0277421 A1 | 11/2010 | Charlier et al. | |
| 2011/0003665 A1* | 1/2011 | Burton et al. | 482/9 |
| 2011/0012921 A1 | 1/2011 | Cholewin et al. | |
| 2011/0012928 A1 | 1/2011 | Cholewin et al. | |
| 2011/0157799 A1 | 6/2011 | Harmon et al. | |
| 2011/0190675 A1 | 8/2011 | Vess | |
| 2011/0221688 A1* | 9/2011 | Byun et al. | 345/173 |
| 2012/0092383 A1* | 4/2012 | Hysek et al. | 345/684 |
| 2012/0127070 A1* | 5/2012 | Ryoo et al. | 345/156 |
| 2012/0139904 A1* | 6/2012 | Lee et al. | 345/419 |
| 2013/0044215 A1* | 2/2013 | Rothkopf et al. | 348/143 |
| 2013/0197857 A1* | 8/2013 | Lu et al. | 702/141 |
| 2014/0018686 A1* | 1/2014 | Medelius et al. | 600/483 |

FOREIGN PATENT DOCUMENTS

| | | |
|---|---|---|
| EP | 1517223 A1 | 3/2005 |
| EP | 0 913 977 B1 | 9/2006 |
| EP | 1754424 A1 | 2/2007 |
| EP | 2150031 A1 | 2/2010 |
| EP | 2 065 786 B1 | 7/2010 |
| FR | 2 771 769 A1 | 6/1999 |
| GB | 2 339 505 A | 1/2000 |
| GB | 2 368 483 A | 6/2002 |
| KR | 100683535 B1 | 2/2007 |
| KR | 1020070035026 A | 3/2007 |
| WO | 2004114636 A1 | 12/2004 |
| WO | 2005071928 A1 | 8/2005 |
| WO | 2005111769 A2 | 11/2005 |
| WO | 2008030563 A2 | 3/2008 |
| WO | 2009123406 A2 | 10/2009 |
| WO | 2010097692 A1 | 9/2010 |

OTHER PUBLICATIONS

Masanori Sugimoto and Keiichi Hiroki, "HybridTouch: An Intuitive Manipulation Technique for PDAs Using Their Front and Rear Surfaces", Proceedings of the 8th Conf. on Human-Computer Interaction with Mobile Devices and Services, Sep. 12, 2006, 4 pages.

Adesso Inc., "Easy Cat 2 Button Glidepoint Touchpad (Black)", http://www.adesso.com/en/componentlcontentlarticle/63-touchpads/189-gp-160.html, printed Sep. 12, 2012, 2 pages.

Patent Cooperation Treaty, "PCT Search Report and Written Opinion of the International Searching Authority" for International Application No. PCT/US2010/031879, Jul. 7, 2010, 14 pages.

Erh-Li (Early) Shen et al., "Double-side Multi-touch Input for Mobile Devices", CHI 2009—Spotlight on Works in Progress, Apr. 4, 2009, pp. 4339-4344.

Daniel Wigdor et al., "Lucid Touch: A See-through Modile Device", Proceedings of the 20th Annual ACM Symposium on User Interface Software and Technology, Oct. 7, 2007, pp. 269-278.

United States Patent and Trademark Office, "Non-Final Office Action" for U.S. Appl. No. 12/433,253, dated Feb. 16, 2012, 22 pages.

United States Patent and Trademark Office, "Non-Final Office Action" for U.S. Appl. No. 12/565,200 dated Jan. 16, 2013, 12 pages.

Patent Cooperation Treaty, "PCT Search Report and Written Opinion of the International Searching Authority" for International Application No. PCT/US2013/055165, Mar. 12, 2014, 10 pages.

Gregory Wilson, "Evaluating the Effectiveness of Using Touch Sensor Capacitors as an Input Device for a Wrist Watch Computer", Georgia Institute of Technology undergraduate thesis, Dec. 17, 2007, 15 pages, smartech.gatech.edu/xmlui/handle/1853/19947.

Jun Rekimoto, "GestureWrist and GesturePad: Unobtrusive Wearable Interaction Devices", 5th IEEE Int'l Symp. on Wearable Computers, 2001, pp. 21-27, http://www.sonycsl.co.jp/person/rekimoto/papers/iswc01.pdf.

Paul H. Dietz et al., "A Practical Pressure Sensitive Computer Keyboard", 22nd Ass'n for Computing Machinery Symp on User Interface Software and Tech., Oct. 4, 2009, 4 pages.

(56) References Cited

OTHER PUBLICATIONS

Samsung, "Samsung Wearable Mobile Device Makes Communication Easier for an Active Lifestyle", Apr. 3, 2010, 10 pages, http://www.tuvie.com/samsung-wearable-mobile-device-can-make-communication-easier-in-adventurous-trips/.

Charles McLellan, "Eleksen Wireless Fabric Keyboard: A First Look", http://www.zdnet.com/eleksen-wireless-fabric-keyboard-a-first-look-3039278954, Jul. 17, 2006; 9 pages.

Microsoft's Lucid Touch transparent, multi-touch mobile device, LucidTouch photo; www.dancewithshadows.com/tech/lucid-touch.asp; Mar. 10, 2008, 2 pp.

Patrick Baudisch, "Application Areas of Lucid Touch", http://research.microsoft.com/users/baudisch/projects/lucidtouch/applications, accessed Nov. 26, 2008, 3 pages.

Patrick Baudisch, "Lucid Touch Homepage", http://research.microsoft.com/users/baudisch/projects/lucidtouch/index.html, accessed Nov. 26, 2008, 1 pg.

Tuvie, "Samsung Wearable Mobile Device Makes Communication Easier for an Active Lifestyle," Apr. 14, 2010, Retrieved from <http://www.tuvie.com/samsung-wearable-mobile-device-can-make-communication-easier-in-adventurous-trips/> 15 pgs.

International Preliminary Report on Patentability from International Application No. PCT/US2013/055165, mailed Mar. 12, 2015, 7 pp.

\* cited by examiner

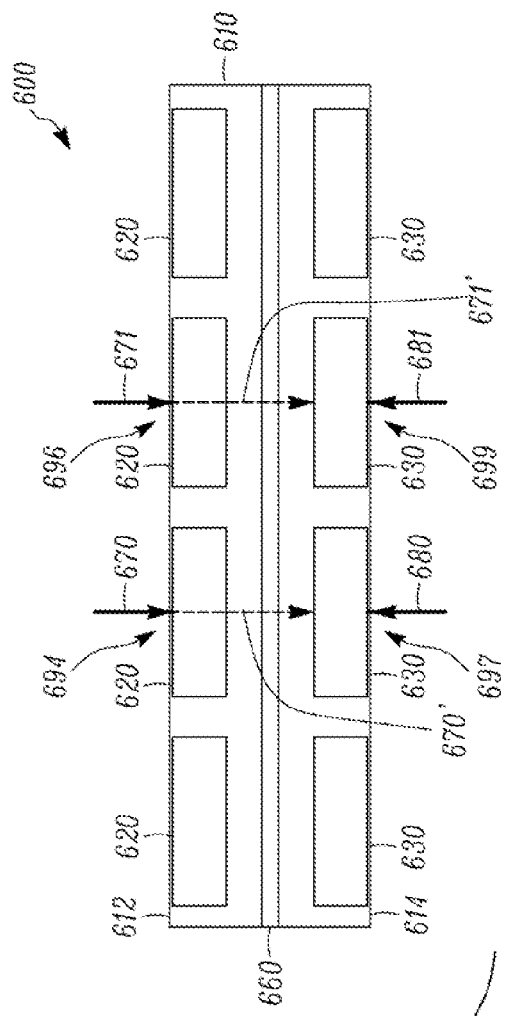
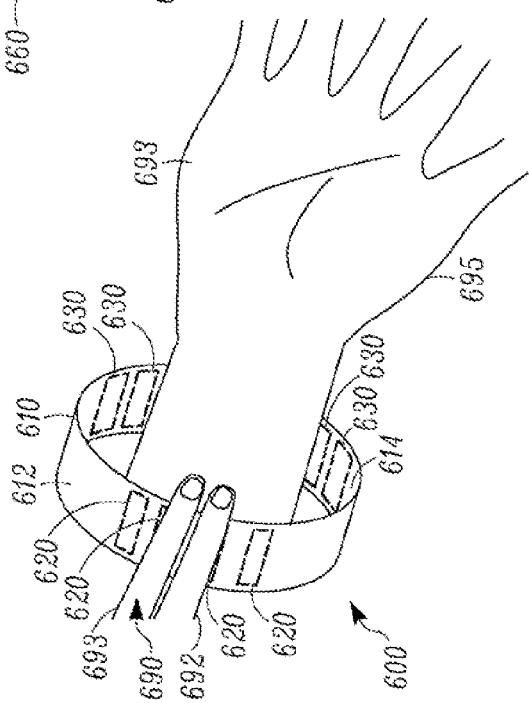
FIG. 6B
FIG. 6A

SYSTEMS AND METHODS FOR A WEARABLE TOUCH-SENSITIVE DEVICE

FIELD

This application generally relates to touch-sensitive components of electronic devices. In particular, the application relates to platforms and techniques for controlling functions associated with a wearable, touch-sensitive device based on tactile interactions with the wearable device.

BACKGROUND

Current electronic devices can include touch-sensitive components configured to detect touch contact associated with user input functionality. For example, functionality associated with a touch screen device configured to detect contact in the form of a finger touch can be controlled based on a type of contact made (e.g., moving or stationary contact, single or multi-touch contact, etc.), a contact location, and/or a time duration of the contact. A "wearable" touch-sensitive device can provide several added benefits, including, for example, allowing the wearer to have one hand free while operating the device and keeping the device "at hand" between uses. These features may be especially convenient when the user is engaged in physical activity, such as exercise. As another example, the wearable device can be used to enhance the user's exercising experience by, for example, monitoring vital signs (e.g., when worn around the user's wrist), tracking progress, providing encouragement, and/or facilitating other functions.

To prevent misinterpretation of inadvertent contact, current touch-sensitive devices can include a feature for temporarily disabling the touch-sensitive components (e.g., locking a touch screen). However, at times, the process of re-enabling the touch-sensitive components (e.g., unlocking a locked device) can be taxing and/or inconvenient, especially, for example, when an emergency call must be made or when the user's attention is engaged otherwise (e.g., while exercising, while talking to others in the immediate vicinity). Accordingly, there is an opportunity to develop a touch-sensitive device that can remain activated while also limiting misinterpretation of inadvertent contact. Further, there is an opportunity to develop a touch-sensitive device that can initiate functionalities in response to detecting various interactions by the user.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

FIGS. 6A, 6B, and 6C illustrate an interaction with an electronic device in accordance with some embodiments.

DETAILED DESCRIPTION

Figure 1A:
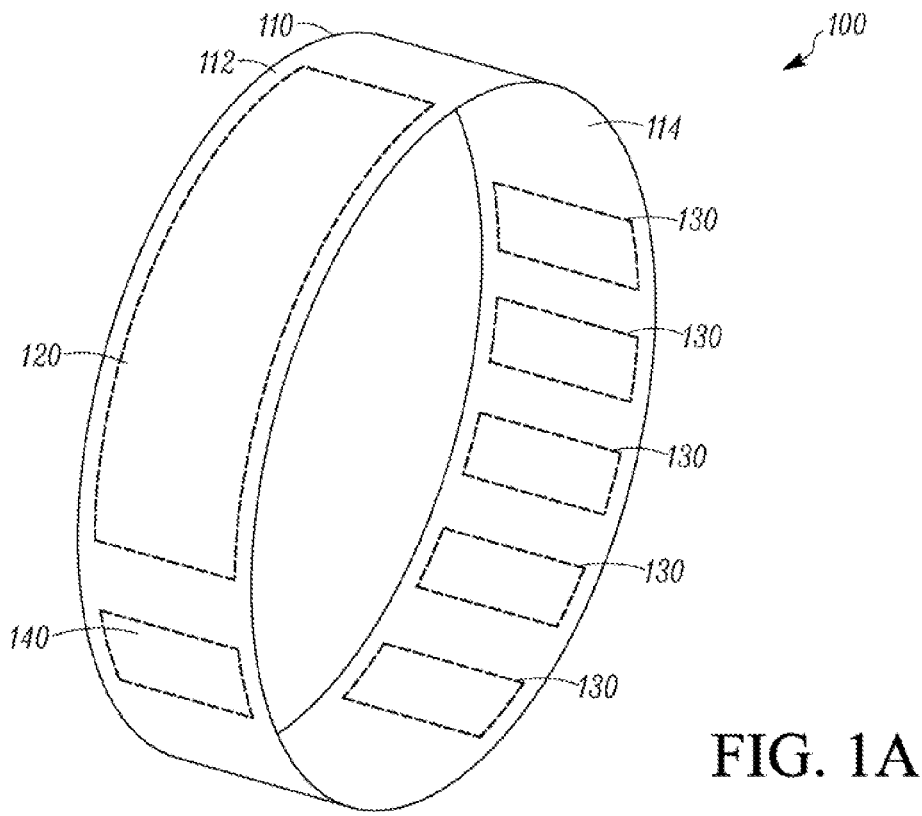
FIGS. 1A, 1B, and 1C illustrate example electronic devices in accordance with some embodiments.

System and methods are disclosed for controlling a touch-sensitive device capable of being worn by a user and detecting user input. More particularly, the systems and methods disclosed herein provide techniques for detecting user input based on tactile interactions with a wearable touch-sensitive device, such as, e.g., a touch-sensitive band capable of being worn around the user's wrist. Further, the touch-sensitive device may be capable of detecting touch contact on both an outside surface and an opposing inside surface of the device. For example, the touch-sensitive device may include one or more contact sensing components on each of the outside surface and the inside surface. Upon detecting a user contact, the contact sensing components may generate one or more contact detection signals and send the signals to a processor. The processor may analyze the received signals to determine whether a predetermined condition is satisfied. In response to this analyzing, the processor may initiate a function associated with the predetermined condition The touch-sensitive device may be capable of detecting tactile user interactions that include gestures, movements, touches, and/or any other form of contact made with the wearable touch-sensitive device using any portion of a hand, including one or more finger(s) and/or a thumb, a wrist, an arm, an ankle, and/or any other body part(s). In some embodiments, the tactile interactions may include natural or intuitive motions that can be performed by the user without looking at the wearable device. Further, the tactile interactions may include stationary and/or moving contact relative to the outside and/or inside surface of the device. In order to be recognized as a valid user input, each tactile interaction may need to be maintained for a predetermined time interval. In some instances, a first touch contact on the outside surface may be detected contemporaneously with a second touch contact on the inside surface. And in some instances, the first touch contact on the outside surface may be parasitically or indirectly detected by a sensor on the inside surface due to, for example, certain mechanical characteristics of the first touch contact.

To give an example of a tactile user input, in some embodiments, a predetermined condition may be satisfied (and an associated function may be initiated) upon determining that a first touch contact corresponds to the user fully gripping and curving fingers around the outside surface of the touch-sensitive band and a second touch contact corresponds to the user's wrist contacting the inside surface of the band, for example, due to the pressure placed by the first contact on the band. As another example, a predetermined condition may be satisfied upon determining that the first contact corresponds to the user placing two or more components of the user's hand (e.g., an index finger and a thumb) on the outside surface of the band and the second contact corresponds to the user sliding the inside surface of the band around the wrist. In yet another example, a predetermined condition may be satisfied upon determining that the first touch contact corresponds to a portion of the user's hand (e.g., one or more fingers) sliding around the outside surface of the touch-sensitive band and the second contact corresponds to the user's wrist contacting the inside surface of the band, for example, due to the pressure placed by the first contact on the band. According to still another example, a predetermined condition may be satisfied upon determining that the first contact corresponds to placement of two or more fingers of the user's hand on a portion of the touch-sensitive band that is adjacent to the underside of the user's wrist and the second touch contact corresponds to the user's wrist contacting the inside surface of the band, for example, due to the pressure placed by the first contact on the band (e.g., like the gesture commonly associated with measuring a radial pulse in a wrist).

Figure 1B:
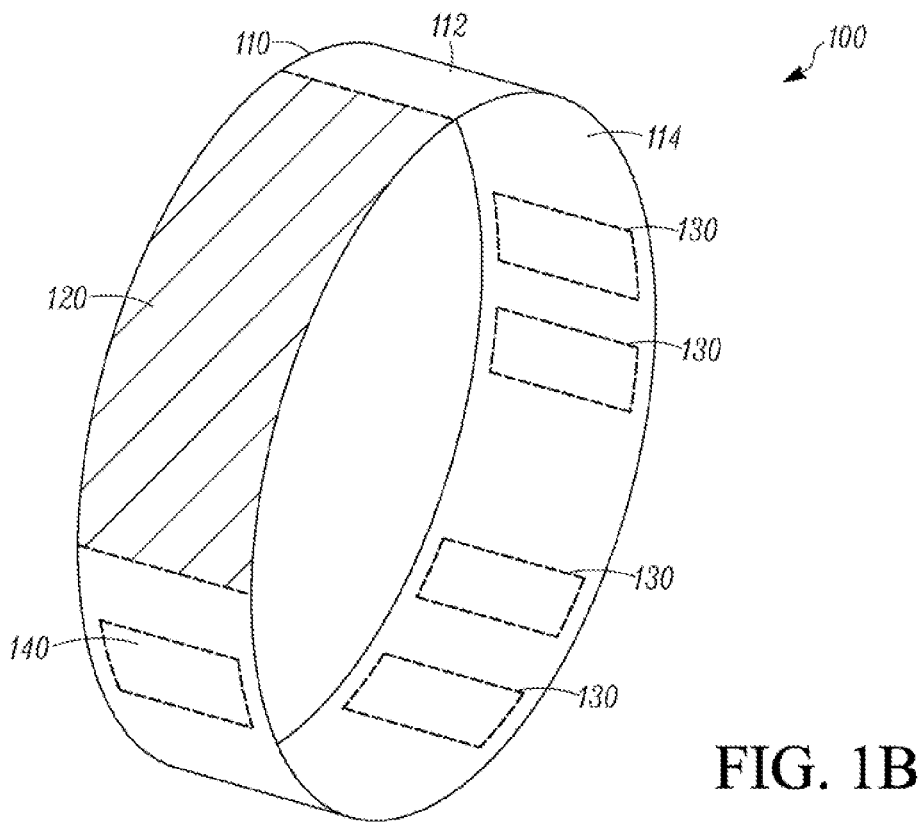
Figure 1C:
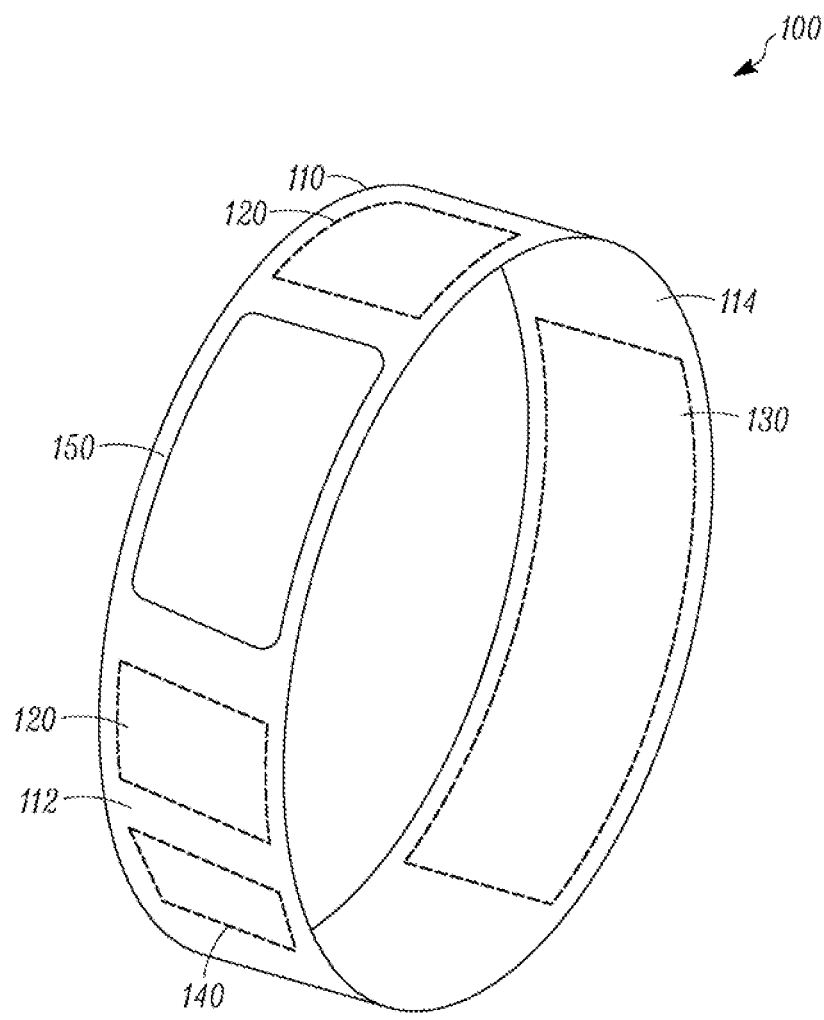

FIGS. 1A, 1B, and 1C depict example wearable devices 100 consistent with some embodiments. It should be appreciated that the wearable device 100, as depicted, is merely an example and can include various combinations of hardware and/or software components. According to some embodiments, the wearable device 100 may be a watchphone, a health monitor, a sportphone, or any other touch-sensitive electronic device that is configured to be worn on a body part of the user.

Figure 6C:
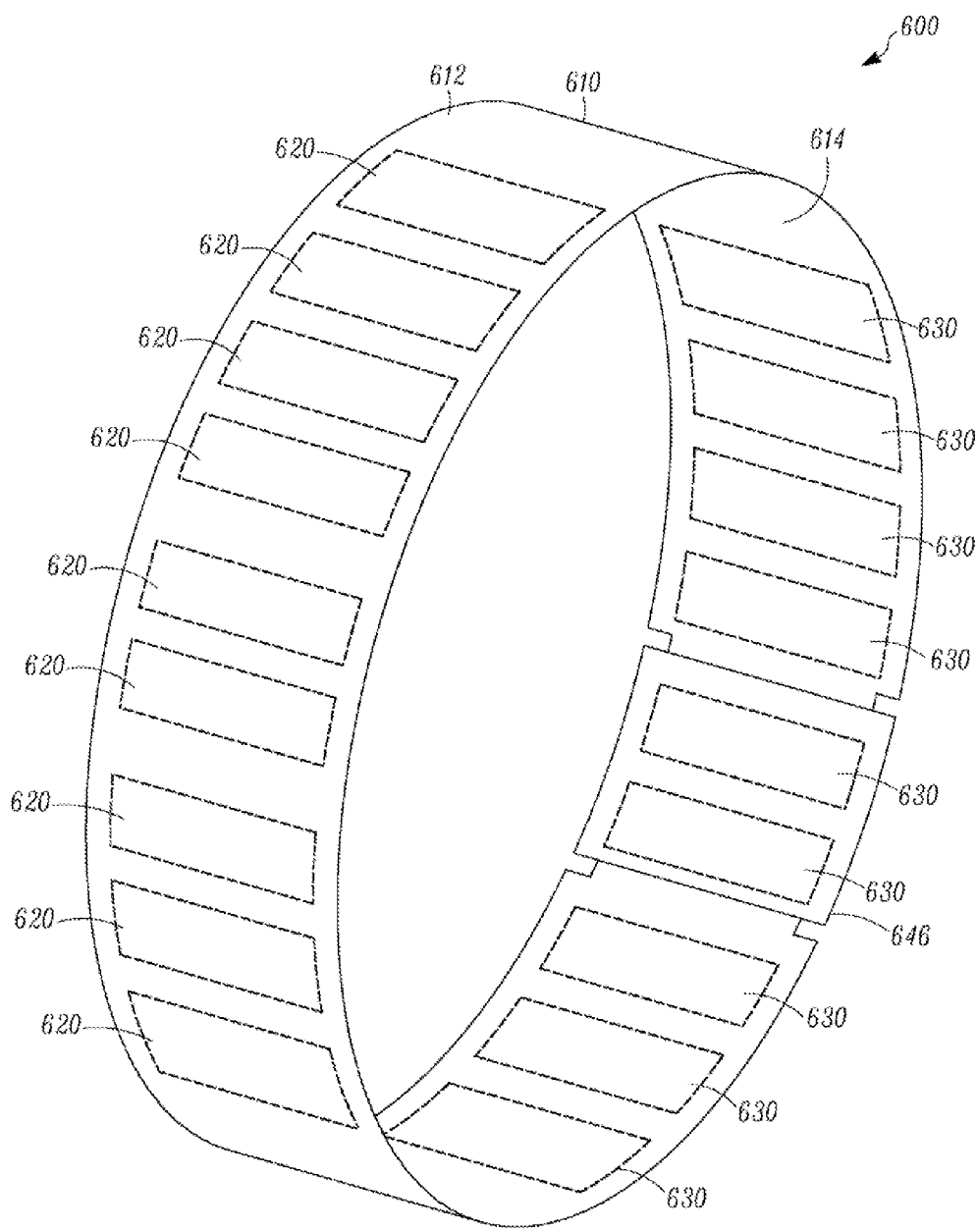

As shown in FIGS. 1A, 1B, and 1C, the wearable device 100 may include a substrate 110 that has an outside surface 112 and an inside surface 114 that is opposite from the outside surface 112. The substrate 110 may be a flexible layer made with metal, plastic, silicone, rubber, elastic, cloth, leather, or other materials or combinations of materials. In some embodiments, the substrate 110 may be configured as a wristband, a bracelet, a watchband, an armband, an anklet, a belt, or any other form of band or strap that is configured to be worn on or around a body part. In some embodiments, e.g., as shown in FIG. 6C, the substrate 110 may include two end portions that are configured to be fastened together (e.g., around the user's wrist) using any of a number of fasteners such as a clasp, clamp, buckle, button, hook-and-loop fastener, and/or the like. In other embodiments, the substrate 110 may be configured as a single, flexible piece that can stretch or expand at least enough to allow a user to slide the substrate 110 over a body part, such as a hand or foot. In one embodiment, the substrate 110 may be configured as multiple links or pieces that are flexibly coupled together by, for example, a string, elastic, a wire, a cord, or any other flexible material.

As illustrated in FIG. 1A, the substrate 110 may be configured to support one or more contact sensing components 120 disposed in close proximity to the outside surface 112 and one or more contact sensing components 130 disposed in close proximity to the inside surface 114. The contact sensing component(s) 120 (hereinafter referred to as outer sensor 120) and the contact sensing component(s) 130 (hereinafter referred to as inner sensors 130) may each be capable of receiving (e.g., determining, sensing, or detecting) contact-based inputs from a user of the electronic device 100. A contact-based input may be triggered by a contact or touch by any finger or thumb of either a left or a right hand of a user. In addition, or in the alternative, a contact-based input may also be triggered by a contact or touch from any portion of a user's hand (including a palm, back of hand, side of hand, knuckle (s), etc.), a wrist, an arm, an ankle, a leg, or any other body part of the user.

The sensors 120, 130 may include any type of contact sensing technology, such as resistive panels, surface acoustic wave (SAW) technology, capacitive sensing (including surface capacitance, projected capacitance, mutual capacitance, and self-capacitance), infrared, optical imaging, dispersive signal technology, acoustic pulse recognition, and/or others. Each sensor 120, 130 may be physically and/or operationally independent of the other sensors. Further, in some embodiments, the outer sensor(s) 120 and/or the inner sensor(s) 130 may include dynamically-determined contact sensing areas. In other embodiments, the outer sensor(s) 120 and/or the inner sensor(s) 130 may be implemented as separate physical buttons or keys. In still other embodiments, an outer sensor 120 (and possibly an inner sensor 130) may be implemented as a touch screen.

Figure 3B:
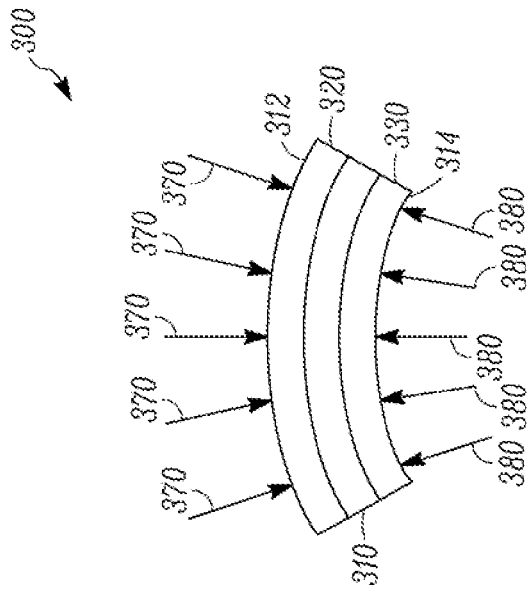
FIGS. 3A and 3B illustrate an interaction with an electronic device in accordance with some embodiments.
Figure 3A:
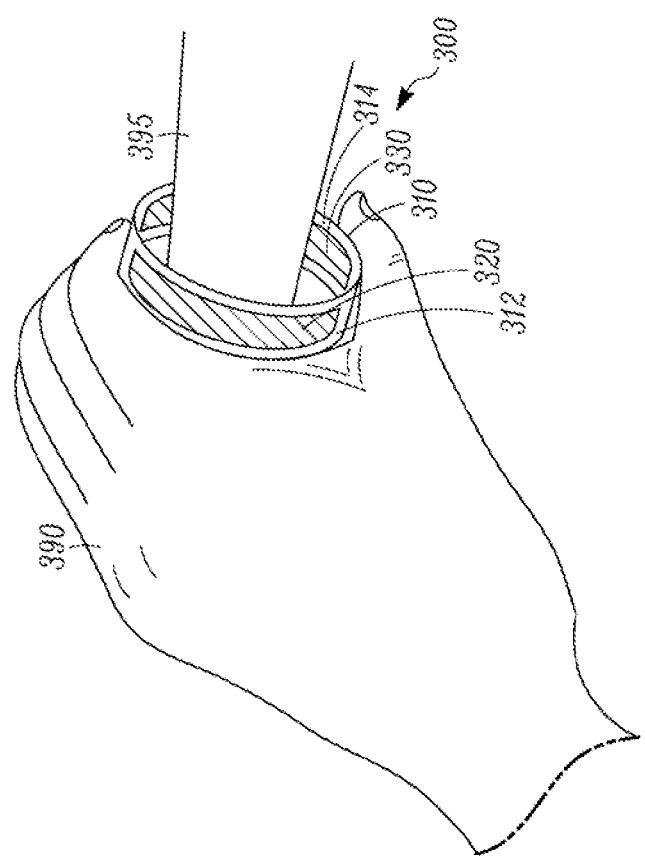

In an exemplary operation, a sensor 120, 130 that is implemented as, for example, a capacitive sensing layer may include a series of nodes capable of sensing a surface contact from, for example, a user's hand or other body part. In response to detecting touch contact at one or more of these nodes, the sensor 120, 130 may generate a contact detection signal(s) and transmit the contact detection signal(s) to a processing module 140 included in the wearable device 100, as shown in FIGS. 1A, 1B, and 1C. According to some aspects, the signals can indicate high or low points based on changes in capacitance due to the surface contact at each of the contacted nodes. The processing module 140 may analyze the high or low points to identify a placement of the user's hand (or other body part) on the sensor 120, 130 and/or any changes in surface contact relative to a previous signal(s). For example, the processing module 140 may detect that a user's hand is gripping the outside surface 112 of the substrate 110 (e.g., as shown in FIG. 3A) based on the nodes of the outer sensor 120 that sense contact.

In the embodiment shown in FIG. 1A, the outer sensor 120 is disposed substantially across a length and a width of the outside surface 112, for example, as a single, continuous touch-sensitive component (e.g., including a contact sensing layer), and the inner sensors 130 are individually disposed across the inside surface 114, for example, as an array of discrete touch sensors. It should be appreciated that the sensors 120, 130 may be disposed, distributed, and/or arranged on the substrate 110 in any manner suitable for any of a wide variety of applications. For example, as discussed in more detail herein, FIGS. 3-6 show four different configurations for arranging the sensors 120, 130 of the wearable device 100. Further, according to certain aspects, the sensors 120, 130 may be arranged or distributed across the substrate 110 to cover at least half of, a majority of, an entirety of, or any other portion of the surfaces 112, 114, respectively. Moreover, the sensors 120, 130 may have any shape, size, quantity, placement, and/or configuration and are not limited to those shown in the figures.

In some embodiments, e.g., as illustrated in FIG. 1B, the outer sensor 120 may form part of a touch screen 120 that is configured to display graphical information and to sense or detect user contact on the touch screen 120. In some embodiments, the touch screen 120 may be flexible, or at least partially flexible, for example, like the substrate 110. Alternatively, the touch screen 120 may have a curvilinear or rectilinear shape that is substantially rigid. In either case, the touch screen 120 may form at least a portion of the outside surface 112. For example, in one embodiment, the touch screen 120 may form at least a majority of the outside surface 112. In some embodiments, the touch screen 120 may be integrated into the substrate 110. In other embodiments, the touch sensor 120 may be disposed over a portion of the outside surface 112.

In still other embodiments, e.g., as illustrated in FIG. 1C, the wearable device 100 may include a display screen 150 configured to display graphical information, and multiple outer sensors 120 may be arranged around the display screen 150 on the outside surface 112 of the substrate 110. In other embodiments, the outer sensors 120 may be disposed underneath and/or over the display screen 150. The substrate 110 may be configured to support the display screen 150, as well as the outer sensors 120. In some embodiments, the outer sensors 120 and/or the display screen 150, and any parts or components associated therewith, may be integrated into the substrate 110. For example, in some embodiments, the display screen 150 may form at least a portion of the outside surface 112 and/or may be flexible, or partially flexible, similar to the substrate 110. Further, in some embodiments, the display screen 150 and/or the substrate 110 may individually include one or more parts or components for supporting various functionalities of the wearable device 100, including contact sensing functions, display functions, and/or wireless communication functions.

A size of the display screen 150 may be selected based on several factors, such as desired screen resolution, power management capacity, and/or included display screen technology. The display screen 150 may use display technology such as electrophoretic displays, electronic paper, polyLED displays, AMOLED displays, OLED displays, liquid crystal displays, electrowetting displays, rotating ball displays, segmented displays, direct drive displays, passive-matrix displays, active-matrix displays, and/or others.

Referring now to the sensors 120, 130 and the processing module 140, the processing module 140 may be an integrated circuit containing a processor and other components configured to process user input and sensor data. The processing module 140 may be configured to interface with the outer sensors 120, the inner sensors 130, and/or other components of the wearable device 100 to receive one or more signals indicating detection of a contact-based input. For example, the sensors 120, 130 may be configured to generate contact detection signals upon sensing any type of touch contact (above a functional or mechanical threshold), and send the contact detection signals to the processing module 140. As an example, upon detection of a first touch contact on the outside surface 112, the outer sensor 120 may generate and send a first signal to the processing module 140. Similarly, upon detection of a second touch contact on the inside surface 114, the inner sensor 130 may generate and send a second signal to the processing module 140. Where the first contact and the second contact occur substantially contemporaneously, the first signal and the second signal may be generated and sent substantially contemporaneously as well.

Upon receiving the touch contact detection signals, the processing module 140 may analyze the contact detection signals to determine whether the detected contact is valid (e.g., an intended user input). In one embodiment, the validity of a detected touch contact may be determined by comparing information retrieved from the contact detection signals with a contact validation threshold. The contact validation threshold may include threshold values for several measurable parameters that relate to a detected contact, such as, e.g., an amount of time that the detected contact is maintained, a magnitude of contact force applied, a change in capacitance caused by the contact, a surface area of the contact's touch point, an amount of resistive force or pressure provided by the contact, a voltage or current level detected in response to the contact, a number of clock cycles associated with the contact, an oscillator frequency associated with the contact, and/or any other measurement information that may be retrieved from the contact detection signals to determine whether the detected touch contact was made inadvertently or deliberately. As will be appreciated, the processing module 140 may consider a detected touch contact to be an invalid contact if it does not overcome the contact validation threshold.

As an example, the processing module 140 may be configured to determine that a detected touch contact is valid if the contact is maintained for at least a predetermined time interval. The wearable device 100 may include one or more timing elements (not shown) that are configured to record timing information, including how long each detected contact is maintained at the detecting sensor 120, 130. In one embodiment, the timing element(s) may be incorporated into the processing module 140 (e.g., timer 742 in FIG. 7). The processing module 140 may analyze the timing information to determine whether the detected contact is maintained for the predetermined time interval. If a detected contact is not maintained for at least the predetermined time interval, the processing module 140 may determine that the touch contact has not overcome the contact validation threshold and, therefore, is not a valid contact.

The predetermined time interval and other threshold values of the contact validation threshold may vary depending on the type of touch-sensitive technology included in the sensors 120, 130 and/or other components included in the wearable device 100. Alternatively, or additionally, the threshold values may vary depending on the type of contact being made (e.g., stationary or moving, single-touch or multi-touch, clockwise or counterclockwise, proximate or distant, contemporaneous or sequential, opposing or displaced, etc.), an aspect of a predetermined condition (e.g., whether parasitic contact detection is desirable), or any other related factor. Thus, in some embodiments, there may be more than one threshold value for each parameter associated with the contact validation threshold, and the various threshold values may be stored in a database and may be accessible by the processing module 140 as needed.

In addition to determining validity of a detected touch contact, the processing module 140 may be configured to analyze the received contact detection signals (e.g., a first signal from an outer sensor 120 and a second signal from an inner sensor 130) to determine whether a predetermined condition is satisfied, and if so, to initiate a function of the wearable device 100 that is associated with the satisfied predetermined condition. According to some embodiments, the wearable device 100 may be associated with several predetermined conditions, and each predetermined condition may include a composite of variables or sub-conditions that must be individually satisfied in order to fulfill the overall predetermined condition. As an example, a database may contain information related to each of the predetermined conditions, including the variables associated with each predetermined condition and the function(s) to be initiated upon satisfaction of a given predetermined condition. The processing module 140 may access this database when determining whether a predetermined condition is satisfied by a detected touch contact. For example, upon receiving contact detection signals, the processing module 140 may be configured to extract information from the signals that is related to one or more of the variables stored in the database. Further, the processing module 140 may be configured to compare the extracted information with the database information to determine whether a predetermined condition is satisfied.

Table 1 provides an exemplary set of predetermined conditions that may be stored in a database and retrieved to analyze received contact detection signals. As seen in Table 1, each predetermined condition has multiple individual variables that must be individually satisfied in order for the predetermined condition to be satisfied as a whole. According to Table 1, these variables may include the location of a touch contact (e.g., is the contact detected by the outer sensor, the inner sensor, or any other component of the device 100), the movement of the contact (e.g., is the contact stationary or moving), the direction of a moving contact (e.g., is the contact moving clockwise or counterclockwise), the number of touch points (e.g., is the contact single-touch or multi-touch), the arrangement of multi-touch contacts, (e.g., are the touch points proximately arranged, distantly arranged, or arranged in a grip hold), the order in which inner and outer contacts are made (e.g., are the contacts made contemporaneously or sequentially), the relative location of stationary inner and outer contacts (e.g., are the contacts directly opposite from each other or displaced from each other), and parasitic contact detection (e.g., whether the inner sensor detects an indirect outer contact).

Table 1 also lists exemplary functions that may be initiated upon satisfaction of each predetermined condition, such as emergency dialing (e.g., making an emergency call using the device 100), volume control (e.g., controlling a volume of audio being played by the device 100, including increasing and/or decreasing the volume), display control (e.g., locking or unlocking the display screen 150), and heart-rate monitor control (e.g., starting or stopping a heart-rate monitor included in the wearable device 100). As will be appreciated, the present disclosure is not limited to the specific examples provided in Table 1.

Also as listed in Table 1, the processing module 140 may analyze information relating to a direction of movement of a touch contact relative to a surface of the wearable device 100 when determining satisfaction of a predetermined condition. For example, a moving contact may move in any direction relative to a surface of the substrate 110, such as clockwise, counter-clockwise, laterally, longitudinally, back and forth (e.g., rubbing), and/or in any type of pattern (e.g., circular, swirling, zig-zag, etc.). In some instances, the ending location may be the same as the beginning location, if, for example, the moving contact travels around an entire exterior or interior surface of the substrate 110, so as to circle back to the beginning location.

Further, as listed in Table 1, the processing module 140 may analyze information relating to an arrangement of the touch points associated with multi-touch contacts when determining satisfaction of a predetermined condition. For example, a multi-touch contact may relate to contact at two or more touch points on a surface of the wearable device 100. The touch points may be arranged or placed in any manner or pattern, including, for example, a grip hold arrangement,

TABLE 1

| Predetermined Condition Variables | | Condition 1 | Condition 2 | Condition 3 | Condition 4 | Condition 5 | Condition 6 |
|---|---|---|---|---|---|---|---|
| Outer Touch Contact | Movement of Contact (Stationary/Moving) | Stationary | Stationary | Stationary | Moving | Moving | Stationary |
| | If Moving, Direction (Clockwise/Counterclockwise) | — | — | — | Clockwise | Counter-clockwise | — |
| | Number of Touch Point(s) (Single-touch/Multi-touch) | Multi-touch | Multi-touch | Multi-touch | Single-touch | Single-touch | Multi-touch |
| | If Multi-touch, Arrangement (Proximate/Distant/Grip) | Grip | Distant | Distant | — | — | Proximate |
| Inner Touch Contact | Movement of Contact (Stationary/Moving) | Stationary | Moving | Moving | Stationary | Stationary | Stationary |
| | If Moving, Direction (Clockwise/Counter-clockwise) | — | Clockwise | Counter-clockwise | — | — | — |
| | Number of Touch Point(s) (Single-touch/Multi-touch) | Multi-touch | Single-touch | Single-touch | Single-touch | Single-touch | Multi-touch |
| | If Multi-touch, Arrangement (Proximate/Distant/Grip) | Grip | — | — | — | — | Proximate |
| | Contact Validation Threshold Overcome by Parasitic Contact? | Yes | N/A | N/A | N/A | N/A | Yes |
| Order of Inner & Outer Contacts (Contemporaneous/Sequential) | | Contemporaneous | Contemporaneous | Contemporaneous | Contemporaneous | Contemporaneous | Contemporaneous. |
| If Stationary Inner and Outer Contacts, Relative Location? (Opposing/Displaced) | | Opposing | — | — | — | — | Opposing |
| Function Initiated | | Dial Emergency Number | Increase Volume | Decrease Volume | Lock Display | Unlock Display | Launch Heart-rate Monitor |

As listed in Table 1, the processing module 140 may analyze information relating the movement of a contact relative to a surface of the wearable device 100 when determining satisfaction of a predetermined condition. As an example, information retrieved from the first signal generated by the outer sensor 120 may indicate whether the first contact is moving or stationary, and information retrieved from the second signal generated by the inner sensor 130 may indicate whether the second contact is moving or stationary. A stationary contact may be any contact that is applied to and remains at one location on a surface of the substrate 110 for a predefined amount of time. An example of stationary contact may be a finger tap on a surface 112. A moving contact may be any contact that is applied to a beginning location on a surface of the substrate 110 and moves (e.g., slides, glides, rubs, travels, etc.) along the surface to an ending location on the surface within a predefined amount of time. An example of moving contact may be swiping a finger along the length of the surface 112.

where the touch points substantially follow the curvature of a curved surface of the wearable device 100 and/or cover a majority portion of the surface. Other touch point arrangements may include a proximate arrangement, where the touch points are in very close proximity to each other, or a distant arrangement, where the touch points are at least a predetermined distance apart from each other (e.g., distance D in FIG. 4). As should be appreciated, any detectable arrangement of the touch points may be used in the predetermined condition analysis.

In addition to, or instead of, the variables listed in Table 1, the predetermined condition may relate to other variables, such as an identity of the sensor(s) being activated by the contact (e.g., which of several outer sensors 120 and/or several inner sensors 130 are being contacted), and/or a velocity of the contact (e.g., in the case of a moving contact). According to some embodiments, instead of including the predetermined time interval in the contact validation analysis described above, this time value may be analyzed as a variable of a predetermined condition.

Similarly, upon determining that a predetermined condition is satisfied, the processing module 140 may initiate other functions of the wearable device 100, in addition to, or instead of, the functions listed in Table 1. Exemplary functions may include powering the device 100 on or off, launching a dialer function of the device 100, silencing a phone ringing function of the device 100, answering an incoming call in loudspeaker mode or private speaker mode, transferring an ongoing call to private speaker mode or loudspeaker mode, muting or un-muting an existing call, playing or pausing a digital media player, invoking a fast-forward or rewind function of a digital media player, or any other function associated with the wearable device 100.

In some embodiments, the processing module 140 may be implemented as a main processor and a contact sensor processor (not shown). The contact sensor processor may be configured to process and analyze at least a portion of the contact detection signals received from each sensor 120, 130, and an output of the contact sensor processor may be sent to the main processor. According to some embodiments, the contact sensor processor may analyze the contact detection signals to determine the contact timing information, contact validation information, information related to the one or more predetermined conditions, or any other information related to the detected touch contact. In one embodiment, the contact sensor processor performs at least a portion of the analysis for determining whether the contact validation threshold is overcome by the detected contact. In one embodiment, the contact sensor processor performs at least a portion of the analysis for determining whether each variable of a predetermined condition is satisfied. In some embodiments, the main processor executes a function in response to receiving an output signal from the contact sensor processor that indicates satisfaction of an associated predetermined condition.

In some embodiments, the display screen 150, the processing module 140, and/or other components for supporting the functionalities of the wearable device 100 may be included in a standalone device that is mechanically coupled to the substrate 110. For example, in one embodiment, the standalone device may be similar in shape and/or design to an electronic wristwatch, a heart-rate monitor, a personal media player, a pedometer, or other personal, portable electronic device. Further, according to such embodiments, the substrate 110 may be configured as a band having one or more portions that are attachable to the standalone device (e.g., similar to a single-piece or a two-piece watchband). Also according to such embodiments, the outer sensor 120 may be disposed on or in close proximity to the substrate 110 and around the standalone device, for example, similar to the configuration shown in FIG. 1C with the display 150 implemented as part of a personal media player that can be detached from the substrate 110.

As described herein, the wearable device 100 may support a variety of functionalities and applications. For example, the wearable device 100 may support wireless communication functionalities such as telephone calls, text messaging, video calls, Internet browsing, emailing, and/or the like, using piezo elements positioned and configured to act as microphones and speakers for supporting telephony and other voice functions. Further, for example, the wearable device 100 may support applications such as games, utilities (e.g., calculators, camera applications, etc.), configuration applications, and/or the like. The wearable device 100 may also support voice-activation technology that allows users to initiate and operate functions and applications of the wearable device 100. In some embodiments, the wearable device 100 may be configured to connect to various wired or wireless personal, local, or wide area networks to facilitate communication with network components and/or other devices.

Figure 2A:
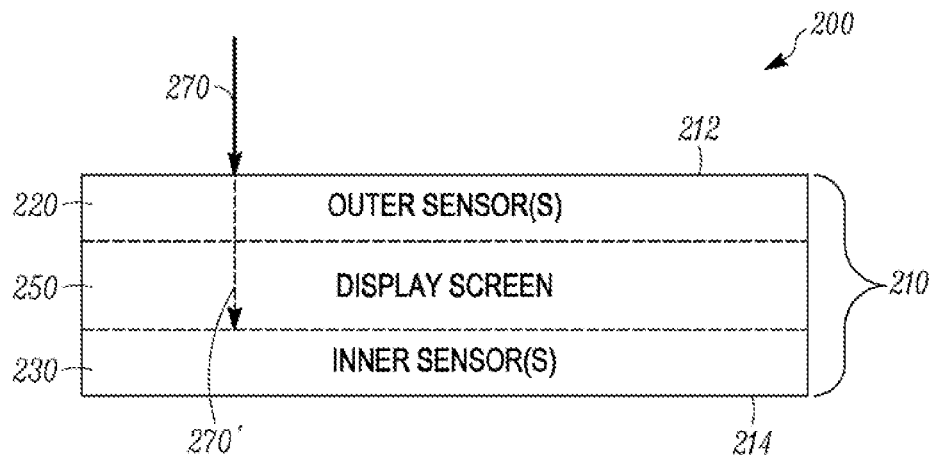
FIGS. 2A, 2B, and 2C illustrate example cross-section views of an electronic device in accordance with some embodiments.
Figure 2B:
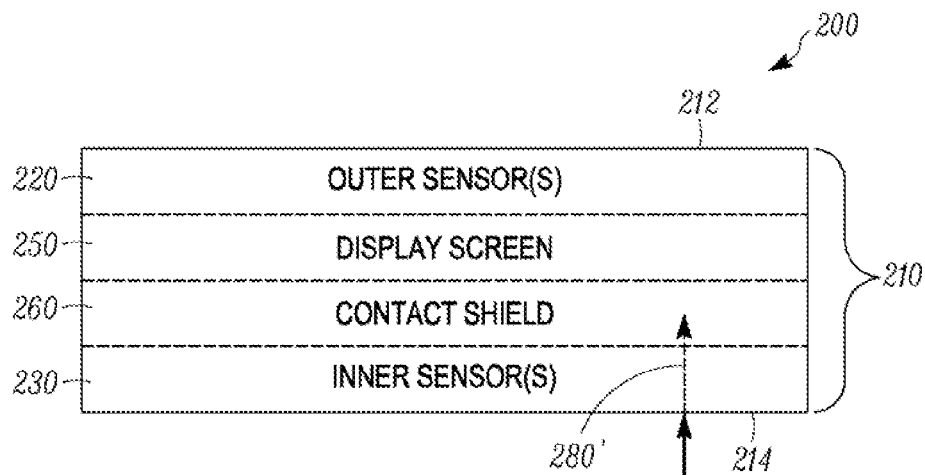
Figure 2C:
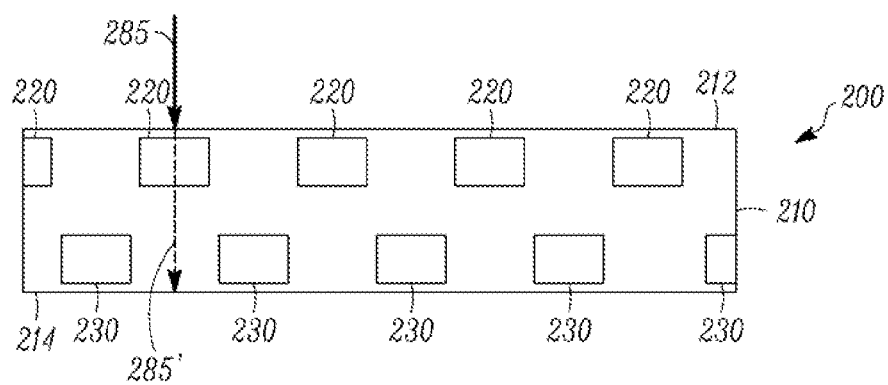

FIGS. 2A, 2B, and 2C illustrate cross-section views of an example wearable device 200. It should be appreciated that the cross-section views are merely examples and the wearable device 200 may include various combinations of components and placements thereof.

As shown in FIGS. 2A, 2B, and 2C, the wearable device 200 may include a substrate 210, one or more outer sensors 220, and one or more inner sensors 230. Each outer sensor 220 and each inner sensor 230 may sense contact made by, for example, a portion of the user's hand or any other body part, and may each include an array of discrete contact sensing components or a single continuous touch sensor. A user of the wearable device 200 may control various functionalities of the wearable device 200 by contacting or touching an outer sensor 220 and/or an inner sensor 230. According to some embodiments, an outer sensor 220 may form part of a touch-screen 220. In other embodiments, the wearable device 200 includes a display screen 250. The substrate 210 may be configured to support the outer sensor 220, the inner sensor 230, and/or the display screen 250. In some embodiments, the outer sensor 220, the inner sensor 230, and/or the display screen 250 may be partially or entirely integrated into the substrate 210, as shown in FIGS. 2A, 2B, and 2C.

In FIG. 2A, an example of undesirable parasitic contact detection is shown, wherein a touch contact 270 applied to the outer sensor 220 on an outside surface 212 is detected not only by the outer sensor 220 but also by the inner sensor 230 on the inside surface 214 as an indirect contact 270'. This may occur, for example, if the inner sensor 230 and the outer sensor 220 are not sufficiently isolated or insulated from each other. Though the indirect contact 270' may be detected to a lesser extent than the direct contact 270, the indirect contact 270' may still be sufficient to overcome a contact validation threshold associated with the wearable device 200 that determines whether a valid contact has been made at a particular sensor.

As discussed above with reference to FIGS. 1A, 1B, and 1C, the contact validation threshold may be related to one or more measurements taken by a sensor 220, 230 in association with a detected touch contact, such as, for example, an amount of time that the contact is maintained, a change in capacitance caused by the contact, a capacitance, voltage, and/or current value detected in response to the contact, a magnitude of the contact force, an amount of resistive force or pressure applied by the contact, and/or a surface area of the contact's touch point. As will be appreciated, if the contact is not sufficient to overcome the contact validation threshold, the contact will not be parasitically detected by a sensor on the opposite side of the device 200 shown in FIG. 2A. The wearable device 200 may include processing components (e.g., processing module 140) for analyzing signals generated by a sensor 220, 230 in response to detecting a touch contact and comparing the signal to the contact validation threshold to determine whether a valid contact has been made.

In FIG. 2B, the wearable device 200 is shown as including a contact shield 260 disposed between the outer sensor 220 and the inner sensor 230. The contact shield 260 may be configured to reduce or prevent parasitic contact detection by a sensor with which the contact was not directly made (e.g., a sensor located on an opposite surface of the device 200). In some embodiments, the contact shield 260 is implemented as an insulating barrier that is disposed between the inner sensor 230 and the outer sensor 220 and is made of rubber, silicone, elastic, plastic, or any other material capable of functioning as a ground element. In one embodiment, a portion of the substrate 210 forms the contact shield 260. In effect, the contact shield 260 may shield the sensors 220, 230 from parasitic contact detection by absorbing the residual effect of the contact (e.g., beyond the sensor at which the contact was directly made). To illustrate, FIG. 2B shows a touch contact 280 that is applied to the inside surface 214 and is detected by the inner sensor 230. The contact shield 260 prevents the touch contact 280 from being parasitically detected by the outer sensor 220 (e.g., as indirect contact 280') by, for example, providing sufficient electrical and/or mechanical insulation between the sensors 220, 230. Thus, in FIG. 2B, the touch contact 280 is detected only by the inner sensor 230, where it is originally applied.

In other embodiments, like that shown in FIG. 2C, the placement of the outer sensors 220 relative to the inner sensors 230 (e.g., where the sensors 220, 230 include discrete touch sensors) may create, or contribute to, a shielding effect for reducing or preventing parasitic contact detection. For example, the outer sensors 220 and the inner sensors 230 may be arranged to avoid, or minimize, vertical overlap between the sensors. Such an arrangement may prevent a sensor from detecting a parasitic contact at least because a sensor is not located directly opposite from the contacted sensor (e.g., on an opposite surface of the substrate 210). In FIG. 2C, for example, the sensors 220, 230 are placed in a staggered or offset arrangement, so that the outer sensors 220 do not directly line up with the inner sensors 230. As shown, a touch contact 285 on the outside surface 212 is detected by the outer sensor 220, but the corresponding indirect contact 285' becomes "absorbed" by the substrate 210. Thus, in some embodiments, the substrate 210, itself, may contribute to electrically and/or mechanically isolating the sensors 220, 230 from each other to prevent parasitic contact detection.

In some embodiments, in addition to, or instead of, the contact shield 260 shown in FIG. 2B and/or placement of sensors 220, 230 shown in FIG. 2C, the contact validation threshold may be configured to prevent or reduce parasitic contact detection by adjusting one or more of the threshold values so that a detected parasitic contact is not determined to be a valid contact. For example, the magnitude of force for a parasitic contact may be lower than that of a direct contact. Accordingly, the threshold value for the magnitude of detected contact force may be raised so that parasitic contacts are not labeled as valid contacts. Similarly, other threshold values may be adjusted to "filter out" or invalidate parasitic contacts. The threshold values may be pre-configured based on a set of known or expected values for parasitic contacts.

Further, the characteristics of the contact shield 260 shown in FIG. 2B, the placement of the sensors 220, 230 shown in FIG. 2C, and/or the contact validation threshold may be selected based on the specific components included in the wearable device 200, the type and/or sensitivity of each sensor 220, 230, the composition of the outer sensor 220, the inner sensor 230, and/or each component there between (e.g., the display screen 250, the contact shield 260, and/or the substrate 210), and/or any other factor. In some embodiments, a combination of a contact shield 260, a placement of the sensors 220, 230, and/or a contact validation threshold may be utilized to prevent or reduce parasitic contact detection.

FIGS. 3-6 depict specific examples of detectable tactile interactions with a wearable touch-sensitive device that may initiate one or more predefined functions associated with the wearable device. It should be appreciated that the following are merely examples and that any of a number of tactile interactions, gestures, movements, contacts, or other types of user inputs may be utilized to initiate the predefined functions.

Referring to FIG. 3A, depicted is an example wearable device 300 in accordance with certain embodiments. Also, FIG. 3B depicts a cross-section view of the wearable device 300. It should be appreciated that the wearable device 300 is merely an example and other components, sizes of components, and scales of components are envisioned.

As shown in FIG. 3A, the wearable device 300 includes a substrate (and arm/wrist, which includes an outside surface 312 and an inside surface 314. The substrate 310 may be configured to support an outer sensor 320 disposed in close proximity to the outside surface 312 and an inner sensor 330 disposed in close proximity to the inside surface 314. In the embodiment of FIG. 3A, the outer sensor 320 and the inner sensor 330 are shown as being continuous touch sensors (e.g., including a contact sensing layer). As will be appreciated, in other embodiments, the sensors 320, 330 may include any type of, or combination of, touch-sensitive components, such as, e.g., discrete touch sensors, a touch pad, and/or a touch screen. In some embodiments, the wearable device 300 may include a display screen (not shown).

In some embodiment, the wearable device 300 may include a contact shield (not shown) configured to reduce parasitic contact detection by a sensor on an opposite side of the substrate 310 than the surface on which a contact is made directly. In other embodiments, instead of, or in addition to, the contact shield, parasitic contact detection may be reduced or prevented by adjusting one or more of the threshold values included in a contact validation threshold associated with the wearable device 300. As discussed above with reference to FIG. 2, by raising a threshold value above a value that is expected for a parasitic contact, the contact validation threshold may operate to prevent a parasitic contact from being detected as a valid contact.

As shown in FIGS. 3A and 3B, a user's hand 390 is depicted as grasping, gripping, or otherwise curving around and making several outer touch contacts 370 with the wearable device 300. According to some embodiments, the wearable device 300 can determine a position of the user's hand 390 and components thereof (e.g., thumb, index finger, etc.) when the user's hand 390 makes the outer touch contacts 370 with the outer sensor 320. For example, the outer sensor 320 can recognize contact made at one or more of a series of nodes of sensor 320, generate signals corresponding to the contact, and send the signals to a processor of the wearable device 300. The processor can analyze the signals to determine a mapping of the contact and the corresponding points of contact by the user's hand 390. For example, the processor may be able to determine that an arrangement of touch points distributed along a substantially curved portion of the outside surface 312, as shown in FIG. 3B, corresponds to a grip-hold or full-grasp of the wearable device 300, as shown in FIG. 3A. In other embodiments, the processor may be able to determine that an arrangement of the touch points distributed across a majority portion of the outside surface 312 corresponds to the full grasp shown in FIG. 3A. In either case, this information about the arrangement of multi-touch contacts on the outside surface 312 may be used to determine whether a predetermined condition is satisfied.

In the particular example shown in FIG. 3B, the outer touch contacts 370 are multi-touch, stationary contacts that are made at multiple locations along the outside surface 312 as the user's hand 390 grasps or curves around the wearable device 300. In some embodiments, the processor may be able to determine that the user's hand 390 is touching a majority portion of the outside surface 312. The pressure applied by the user's hand 390 onto the outside surface 312 may cause at least a portion of the wearable device 300 to contact a body part 395 of the user on which the wearable device 300 is being worn (e.g., an arm or a wrist). This touch contact (e.g., inner touch contacts 380) on the inside surface 314 may be detected by the inner sensors 330 as multi-touch, stationary contacts. The inner touch contacts 380 may be detected by the inner sensor 330 at substantially the same time as the outer touch contacts 370 are detected by the outer sensor 320. FIG. 3B shows that the touch points associated with the inner touch contacts 380 substantially follow the curvature of the inside surface 314. Based on this arrangement of touch points, the processor may be able to determine that inner touch contacts 380 correspond to a grip hold, or full grasping, of the wearable device 300, similar to outer touch contacts 370.

Based on the detected contacts, the sensors 320, 330 may generate contact detection signals that are sent to the processor of the wearable device 300. The processor may analyze the received signals to determine whether a predetermined condition is satisfied by considering several factors including, for example, whether a contact is detected by the outer sensor 320, the number of touch points in each contact (e.g., single-touch or multi-touch), whether each contact is maintained for a predetermined time interval, the movement of each contact (e.g., stationary or moving), the arrangement of multi-touch contacts (e.g., whether the touch points match a predefined arrangement, such as a grip hold), whether a contact is detected by the inner sensor 330, and/or whether the inner and outer contacts are overlapping in time.

According to some embodiments, the predetermined condition analysis may also include determining whether the outer touch contacts 370 are detected by the inner sensor 330 as indirect contacts 370' (not shown) and if so, whether the indirect contacts 370' overcome the contact validation threshold so as to be considered valid contacts. As a result, the inner sensors 330 may detect two sets of valid contacts: the indirect contacts 370' (not shown) and the inner touch contacts 380, while the outer sensors 320 may detect one set of valid contacts, the outer touch contacts 370. The depicted tactile interaction may occur, for example, if the user grips the wearable device 300 with a force or pressure sufficient to cause the outer touch contacts 370 to be parasitically detected by the inner sensor 330 as valid, indirect contacts 370'. In some instances, the reverse may occur: inner touch contacts 380 may be parasitically detected by the outer sensors 320 as indirect contacts 380' (not shown). This can occur when a user tugs the wearable device 300 down at the inner wrist; then the outer wrist may provide pressure that is parasitically detected by the outer sensors 320.

Upon analyzing contact detection signals corresponding to the tactile interaction depicted in FIG. 3A, the processor may, for example, determine that the predetermined condition for making an emergency call is satisfied and may initiate the associated function (e.g., place the emergency call). Other functions associated with the wearable device 300 may be initiated by the tactile interaction depicted in FIG. 3A, as should be appreciated.

Figure 4B:
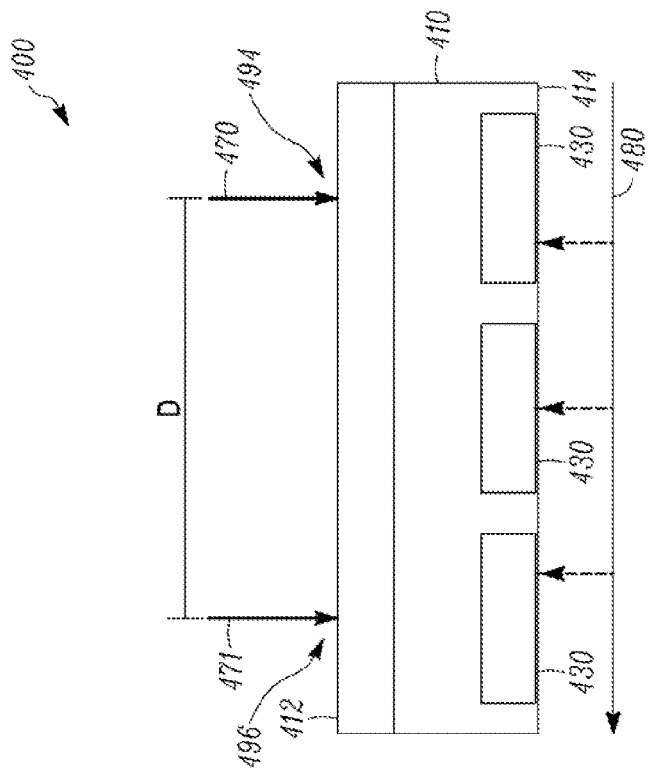
FIGS. 4A and 4B illustrate an interaction with an electronic device in accordance with some embodiments.
Figure 4A:
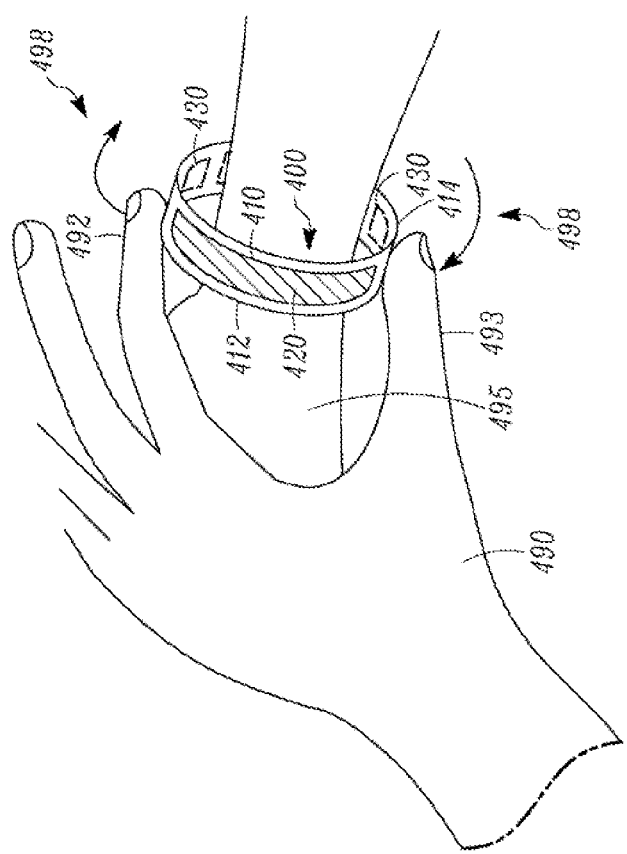

Referring to FIG. 4A, depicted is an example wearable device 400 in accordance with certain embodiments. Also, FIG. 4B depicts a cross-section view of the wearable device 400. It should be appreciated that the wearable device 400 is merely an example and other components, sizes of components, and scales of components are envisioned.

As shown in FIG. 4A, the wearable device 400 includes a substrate 410, which includes an outside surface 412 and an inside surface 414. The substrate 410 may be configured to support an outer sensor 420 disposed in close proximity to the outside surface 412 and an inner sensor 430 disposed in close proximity to the inside surface 414. In FIGS. 4A and 4B, the outer sensor 420 is shown as being a continuous touch sensor and the inner sensors 430 are shown as being discrete touch sensors. As will be appreciated, in other embodiments, the sensors 420, 430 may include any other types of, or combinations of, touch-sensitive components, such as a touch screen. In some embodiments, the wearable device 400 may include a display screen (not shown).

In FIGS. 4A and 4B, two components 492 and 493 (e.g., an index finger and a thumb) of a user's hand 490 are depicted as making two respective stationary touch contacts 470, 471 at two respective locations 494, 496 on the outside surface 412 of the wearable device 400. In response to the depicted tactile interaction, the outer sensor 420 may generate contact detection signals indicating detection of the at least two outer, multi-touch contacts 470, 471. Further, as shown in FIG. 4A, the contact locations 494, 496 may be positioned a distance D apart. The distance D may be larger or smaller depending on which components 492, 493 of the user's hand 490 are in contact with the wearable device 400 and/or how the user chooses to grasp the device 400.

Also in FIGS. 4A and 4B, the wearable device 400 is depicted as being worn around a user's wrist 495, and the user's hand 490 is depicted as moving the wearable device 400 in a direction 498 around the user's wrist 495. As shown in FIG. 4B, the pressure of the stationary touch contacts 470, 471 on the outside surface 412 of the wearable device 400 may be sufficient to cause the inside surface 414 to contact at least a portion of the user's wrist 495 as the wearable device 400 is rotated or slid around the user's wrist 495. This contact (e.g., inner touch contacts 480) between the inside surface 414 and the user's wrist 495 (e.g., wrist bone or ulnar styloid) may be detected by inner sensors 430 as a single-touch, moving contact that corresponds to a rotation of the wearable device 400 around the user's wrist 495. In some embodiments, the inner touch contact 480 may be caused by a multi-touch contact.

In response to the tactile interaction depicted in FIGS. 4A and 4B, the outer sensor 420 and the inner sensors 430 may generate and send contact detection signals for the detected touch contacts 470, 471, and 480 to a processor of the wearable device 400. The processor may analyze the received signals to determine whether a predetermined condition is satisfied by the detected touch contacts 470, 471,480. The processor may consider several factors during its analysis including, for example, whether a stationary contact is detected by the outer sensor 420, whether each contact is maintained for a predetermined time interval, the number of touch points in each contact (e.g., single-touch or multi-touch), whether a moving contact is detected by the inner sensor, and if so, whether the moving contact is traveling in a pre-specified direction, and/or whether the outer and inner contacts are overlapping in time (e.g., contemporaneous).

In some embodiments, the predetermined condition analysis further includes determining an arrangement of the touch points in a multi-touch contact on the outside surface 412. More specifically, in the case of FIG. 4A, a determination may be made as to whether the outer touch contacts 470, 471 are located at least a predetermined contact distance apart. The predetermined distance may be set to differentiate proximate stationary contacts (e.g., made by two fingers held substantially side-by-side) from distant stationary contacts (e.g., made by two fingers spread apart). For example, based on the contact detection signals, the processor may determine that the touch contacts 470, 471 are located a distance D apart, that the distance D is greater than the predetermined contact distance, and therefore, at least a portion of a particular predetermined condition is satisfied. In some embodiments, the processor may be configured to determine which components of the user's hand 490 are positioned on the outside surface 412 and determine whether a predetermined condition is satisfied based thereon. For example, the processor may be able to determine from the contact detection signals that the index finger 492 and the thumb 493 of the user's hand 490 are making touch contacts 470, 471, respectively, with the wearable device 400, in addition to the inner touch contact 480, and therefore, at least a portion of a particular predetermined condition is satisfied.

In response to the analyzing the contact detection signals, the processor may initiate a function associated with the predetermined condition satisfied by the detected contacts. For example, in some embodiments, rotating the wearable device 400 around the user's wrist 495 may be associated with controlling a lock function for the display screen, controlling a volume function of the wearable device 400, or any other function associated with the device 400. In one embodiment, rotating the wearable device 400 in the direction 498 (e.g., clockwise) may indicate a user input to increase the volume, and rotating the wearable device 400 in the opposite direction (e.g., counter-clockwise) may indicate a user input to decrease the volume, or vice versa. In another embodiment, rotating the device 400 in the direction 498 may indicate a user input to lock the display screen, and rotating in an opposite direction may indicate a user input to unlock the display screen, or vice versa.

It should be appreciated that the tactile interaction illustrated in FIGS. 4A and 4B is one example and that any of a number of modifications may be made. For example, the outer touch contacts 470, 471 may be made by contacting the outside surface 412 with any two components of the user's hand 490 (e.g., one or more fingers, thumb, palm, back of hand, knuckles, side of hand, etc.).

Figure 5B:
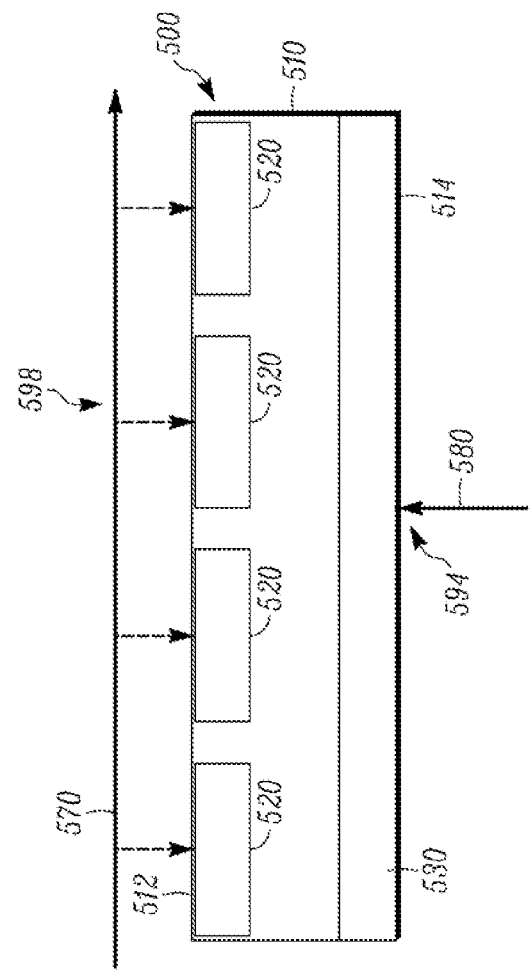
FIGS. 5A and 5B illustrate an interaction with an electronic device in accordance with some embodiments.
Figure 5A:
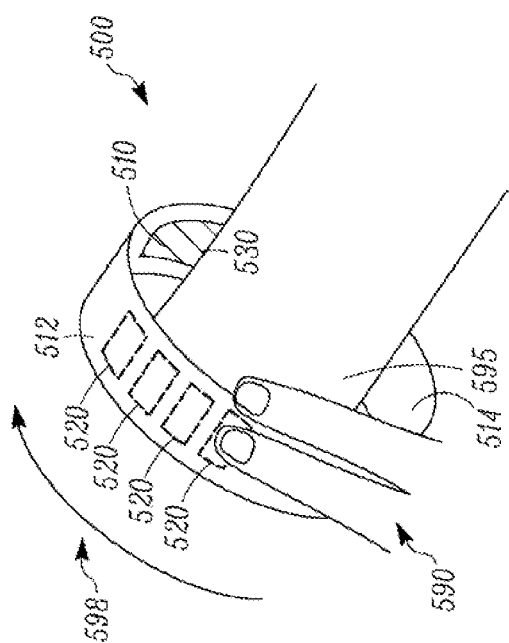

Referring to FIG. 5A, depicted is an example wearable device 500 in accordance with certain embodiments. Also, FIG. 5B depicts a cross-section view of the wearable device 500. It should be appreciated that the wearable device 500 is merely an example and other components, sizes of components, and scales of components are envisioned.

As shown in FIG. 5A, the wearable device 500 includes a substrate 510 that includes an outside surface 512 and an inside surface 514. The substrate 510 may be configured to support an outer sensor 520 disposed in close proximity to the outside surface 512 and an inner sensor 530 disposed in close proximity to the inside surface 514. In FIGS. 5A and 5B, the outer sensors 520 are shown as being discrete touch sensors, and the inner sensor 530 is shown as being a continuous touch sensor. As will be appreciated, in other embodiments, the sensors 520, 530 may include any other type of, or combination of, touch-sensitive components, such as a touch screen. In some embodiments, the wearable device 500 may include a display screen (not shown).

In FIGS. 5A and 5B, a portion of the user's hand 590 is depicted as making a single-touch, moving contact 570 along the outside surface 512 of the wearable device 500. Further, the wearable device 500 is shown as being worn around a wrist 595 of the user, and the outer touch contact 570 is shown as moving in a direction 598 along the band 500 and around the wrist 595. For example, the outer touch contact 570 may be made by sliding a finger around the band 500. As another example, any portion of the user's hand 590 (e.g., one or more fingers, thumb, palm, one or more knuckles, a back of the hand, etc.) may be slid along the wearable band 500 to make the outer touch contact 570. In some cases, the outer contact 570 may be caused by a multi-touch contact. In some instances, the pressure of the user's hand 590 on the wearable band 500 may be sufficient to cause the inside surface 514 to contact the user's wrist 595. As shown in FIG. 5B, this contact (e.g., inner touch contact 580) may be detected by the inner sensor 530 at a location 594 on the inside surface 514. In some instances, inner touch contact 580 may be caused by a single-touch, stationary contact. In other instances, inner contact 580 may be caused by a multi-touch contact where the user's wrist 595 contacts the inside surface 514 at more than one touch-point.

In response to the tactile interaction illustrated in FIGS. 5A and 5B, the outer sensors 520 may detect the outer touch contact 570 moving in the direction 598, and at least one of the inner sensors 530 may detect the inner touch contact 580. Upon receiving the corresponding contact detection signals generated by the sensors 520, 530, a processor of the wearable device 500 may analyze the received signals to determine whether a predetermined condition is satisfied. The processor may consider several factors during its analysis including, for example, whether a stationary contact has been detected by the inner sensor 530, whether each contact is maintained for a predetermined time interval, the number of touch points in each contact (e.g., single-touch or multi-touch), and/or whether a moving contact has been detected by the outer sensor 520, and if so, whether the contact is moving in a pre-specified direction (e.g., clockwise, counter-clockwise, etc.), and/or whether the touch contacts 570, 580 are detected contemporaneously.

In response to analyzing the contact detection signal(s), the processor may initiate a function associated with the predetermined condition satisfied by the detected contact(s). For example, in some embodiments, sliding one or more fingers along the direction 598 on the outside surface 512 of the wearable device 500 may be associated with launching a dialing function, controlling a fast-forward/rewind function of the wearable device 500, controlling a lock function for the display screen, and any other function associated with the wearable device 500. In one embodiment, sliding in the direction 598 (e.g., clockwise) may indicate a user input to increase the volume, while sliding in the opposite direction (e.g., counter-clockwise) may indicate a user input to decrease the volume, or vice versa. In another embodiment, sliding in the direction 598 may indicate a user input to lock the display screen, and sliding in the opposite direction may indicate a user input to unlock the display screen, or vice versa.

Referring to FIG. 6A, depicted is an example wearable device 600 in accordance with certain embodiments. Also, FIG. 6B depicts a cross-section view of the wearable device 600. Further, FIG. 6C depicts one embodiment of the exemplary wearable device 600. It should be appreciated that the wearable device 600 is merely an example and other components, sizes of components, and scales of components are envisioned.

As shown in FIG. 6A, the wearable device 600 includes a substrate 610, which includes an outside surface 612 and an inside surface 614. The substrate 610 may be configured to support an outer sensor 620 disposed in close proximity to the outside surface 612 and an inner sensor 630 disposed in close proximity to the inside surface 614. In FIGS. 6A and 6B, the outer sensors 620 and the inner sensors 630 are both shown as being discrete touch sensors, but either sensor (or both sensors) could alternately be implemented as a continuous sensor. As will be appreciated, in other embodiments, the sensors 620, 630 may include any other types of, or combinations of, touch-sensitive components, such as a touch screen or a continuous touch sensor. In some embodiments, the wearable device 600 may include a display screen (not shown).

In FIG. 6B, the wearable device 600 is shown as having a contact shield 660 disposed between the outer sensor 620 and the inner sensor 630. The contact shield 660 may be configured to reduce parasitic contact detection by a sensor on an opposite side of the substrate 610 than the surface on which the contact is directly made. In some embodiments, the contact shield 660 is a portion of the substrate 610, or is otherwise integrated into the substrate 610. In other embodiments, instead of, or in addition to the contact shield 660, parasitic contact detection may be reduced or prevented by adjusting one or more of the threshold values included in a contact validation threshold associated with the wearable device 600. As explained above with reference to FIG. 2, by raising a threshold value above a value that is expected for a parasitic contact, the contact validation threshold may operate to prevent a parasitic contact from being detected as a valid contact.

As shown in FIG. 6C, the wearable device 600 may further include a fastener 646 for detachably coupling two portions 642, 643 of the substrate 610. According to some embodiments, the fastener 646 may be made of a flexible material similar to that of the substrate 610. In other embodiments, a more rigid material, such as metal or hard plastic, may form the fastener 646. The fastener 646 may be either a one piece or a two piece assembly and may be similar to conventional watchband buckles, clasps, or hook-and-loop fasteners. According to some embodiments, the fastener 646 may form a portion of the outside surface 612 and/or the inside surface 614. In some embodiments, one or more of the sensors 620, 630 may be disposed on, underneath, or in close proximity to the fastener 646. In one embodiment, one or more of the sensors 620, 630 may be integrated into the fastener 646. As an example, when the wearable device 600 is worn around a wrist 695 of the user, the fastener 646 may be intended to be worn close to the user's inner wrist or the ulnar artery, like a conventional watch buckle.

In FIG. 6A, the wearable device 600 is shown as being worn around, or close to, the wrist 695 on a right hand 693 of the user. In FIGS. 6A and 6B, shown are two fingers 692, 693 of the user's left hand 690 that are making outer touch contacts 670, 671 at two proximate, or substantially close locations 694, 696 on the outside surface 612 of the wearable device 600. The outer touch contacts 670, 671 may be stationary, multi-touch contacts that are detected by the two outer sensors 620 that are located at or near the locations 694, 696. In some embodiments, the contact locations 694, 696 may be less than or equal to a finger-width apart. For example, as shown in FIG. 6A, the two fingers 692, 693 may be held side-by-side when making contact with the outside surface 612. According to one embodiment, the two locations 694, 696 coincide with at least a portion of the fastener 646. As will be appreciated, the depicted tactile interaction may be similar to a commonly-known gesture for measuring one's radial pulse by pressing two fingers from one hand against the ulnar artery of the opposite hand.

As shown in FIG. 6B, the pressure applied by the fingers 692, 693 on the wearable device 600 may cause the inside surface 614 to contact the user's wrist 695 at two proximate locations 697, 699 that are opposite from the two contact locations 694, 696, respectively, on the outside surface 612. This contact (e.g., inner touch contacts 680, 681) may be detected by the inner sensors 630 that are located at, or close to, the locations 697, 699 as stationary, multi-touch contacts. According to one embodiment, the user's fingers 692, 693 are placed on the fastener 646, so that the touch contact locations 694, 696, 697, 699 coincide with one or more portions of the fastener 646.

According to the embodiment shown in FIG. 6B, the outer touch contacts 670, 671 on the outside surface 612 are able to overcome the contact shield 660 and be detected by the inner sensors 630 as indirect contacts 670', 671'. (Note that in some situations, the outer touch contacts 670, 671 may fail to overcome the contact validation threshold.) In response to the tactile interaction illustrated in FIG. 6A, the inner sensors 630 may detect two sets of valid contacts: the indirect contacts 670', 671' and the inner touch contacts 680, 681, while the outer sensors 620 may detect only one set of valid touch contacts, the outer touch contacts 670, 671. In some instances, the reverse may occur: inner touch contacts 680, 681 may be parasitically detected by outer sensors 620.

Upon receiving contact detection signals generated by the sensors 620, 630 with respect to detected touch contacts 670, 671, 680, 681, a processor of the wearable device 600 may analyze the received signals to determine whether a predetermined condition is satisfied by the detected contacts. The processor may consider several variables during its analysis including, for example, whether the contact validation threshold and/or the contact shield 660 has been overcome (e.g., in the case of a parasitic contact), whether the contacts are maintained for a predetermined time interval (e.g., two seconds, ten seconds, etc.), the number of touch points in each contact (e.g., single-touch or multi-touch), whether at least two stationary contacts have been detected by the outer sensors 620 on the outside surface 612, an arrangement of the touch points in a multi-touch contact (e.g., whether the contacts are detected at sufficiently proximate locations), whether two stationary contacts have also been detected by the inner sensors 630 at opposite locations on the inside surface 614, whether the outer and inner contacts are detected contemporaneously (e.g., overlapping in time), and/or a relative location of the contacts (e.g., whether the contacts in both the outside surface 612 and the inside surface 614 were detected on, underneath, or in close proximity to the fastener 646).

In response to analyzing the contact detection signals, the processor may initiate a function associated with the predetermined condition that is satisfied by the detected contacts. For example, in some embodiments, pressing two or more fingers against the fastener 646 may be associated with launching a heart rate monitor of the device 600 (e.g., for use during exercise), launching a dialing function of the device 600, pausing a music track that is being played by the device 600, or any other function associated with the wearable device 600.

It should be appreciated that the tactile interaction illustrated in FIGS. 6A and 6B is one example and that any of a number of modifications may be made. For example, any number of fingers 692, 693 and/or other portion(s) of the user's hand 690 (e.g., thumb, palm, back of hand, side of hand, knuckles, etc.) may be used to make the one or more outer touch contacts 670.

Figure 7:
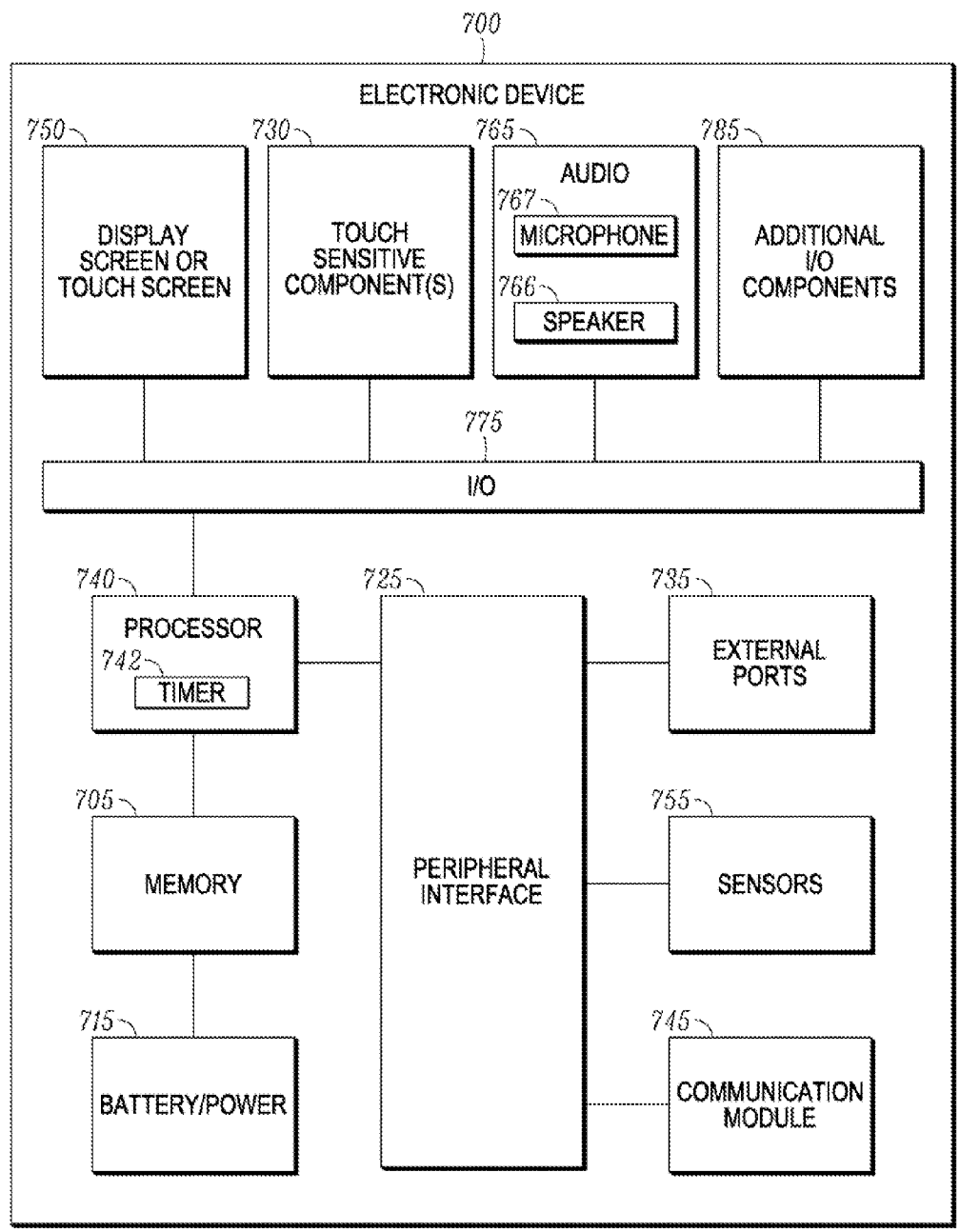
FIG. 7 is a block diagram of an electronic device in accordance with some embodiments.

FIG. 7 illustrates an example wearable device 700 in which some embodiments may be implemented. The electronic device 700 can include a processor 740, a timer 742, memory 705 (e.g., hard drives, flash memory, MicroSD cards, and others), a power module 715 (e.g., flexible batteries, wired or wireless charging circuits, etc.), a peripheral interface 725, and one or more external ports 735 (e.g., Universal Serial Bus (USB), HDMI, Firewire, and/or others). The electronic device 700 can further include a communication module 745 configured to interface with the one or more external ports 735. For example, the communication module 745 can include one or more transceivers functioning in accordance with IEEE standards, 3GPP standards, or other standards, and configured to receive and transmit data via the one or more external ports 735. More particularly, the communication module 745 can include one or more WWAN transceivers configured to communicate with a wide area network including one or more cell sites or base stations to communicatively connect the electronic device 700 to additional devices or components. Further, the communication module 745 can include one or more WLAN and/or WPAN transceivers configured to connect the electronic device 700 to local area networks and/or personal area networks, such as a Bluetooth® network.

The electronic device 700 further includes touch-sensitive components 730, a display screen 750 (such as display screen 150), and additional I/O components 785 (e.g., capacitors, keys, buttons, lights, LEDs, cursor control devices, haptic devices, and others). The display screen 750, touch-sensitive components 730 (e.g., outer sensor(s) 120 and/or inner sensor (s) 130), and the additional I/O components 785 may be considered to form portions of a user interface (e.g., portions of the electronic device 700 associated with presenting information to the user and/or receiving inputs from the user).

In some embodiments, the display screen 750 is a touch-screen display using singular or combinations of display technologies such as electrophoretic displays, electronic paper, polyLED displays, OLED displays, AMOLED displays, liquid crystal displays, electrowetting displays, rotating ball displays, segmented displays, direct drive displays, passive-matrix displays, active-matrix displays, and/or others. Further, the touch screen 750 can include a thin, transparent touch sensor component (e.g., outer sensor 120) superimposed upon a display section that is viewable by a user. For example, such displays include capacitive displays, resistive displays, surface acoustic wave (SAW) displays, optical imaging displays, and the like. When the touch screen 750 includes the outer sensor 120, the touch-sensitive components 730 may only include the inner sensors 130.

The touch screen 750 and/or touch-sensitive components 730 can be configured to interact with various manipulators, such as a human finger or hand. Each type of manipulator, when brought into contact with the touch screen 750 and/or touch-sensitive components 730, can cause the touch screen 750 and/or touch-sensitive components 730 to produce a signal that can be received and interpreted as a contact or touch event by the processor 740. The processor 740 is configured to determine the location of the contact on the surface of the touch screen 750 and/or touch-sensitive components 730, as well as other selected attributes of the touch event (e.g., movement of the manipulator(s) across the surface of the screen, directions and velocities of such movement, touch pressure, touch duration, single touch or multi-touch, and others). The touch screen 750, the touch-sensitive components 730, and/or one of the additional I/O components 785 can also provide haptic feedback to the user (e.g., a clicking response or keypress feel) in response to a touch event. The touch screen 750 can have any suitable rectilinear or curvilinear shape, and may be oriented, rolled, or otherwise manipulated as required to be worn by the user of the wearable device 700.

The electronic device 700 can further include one or more (non-touch) sensors 755 such as, for example, accelerometers, gyroscopic sensors (e.g., three angular-axis sensors), proximity sensors (e.g., light detecting sensors, or infrared receivers or transceivers), tilt sensors, cameras, and/or other sensors; and an audio module 765 including hardware components such as a speaker 766 for outputting audio and a microphone 767 for receiving audio. In some embodiments, the speaker 766 and the microphone 767 can be piezoelectric components. The electronic device 700 further includes an input/output (I/O) controller 775.

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 740 (e.g., working in connection with an operating system) to implement a user interface method as described below. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

Figure 8A:
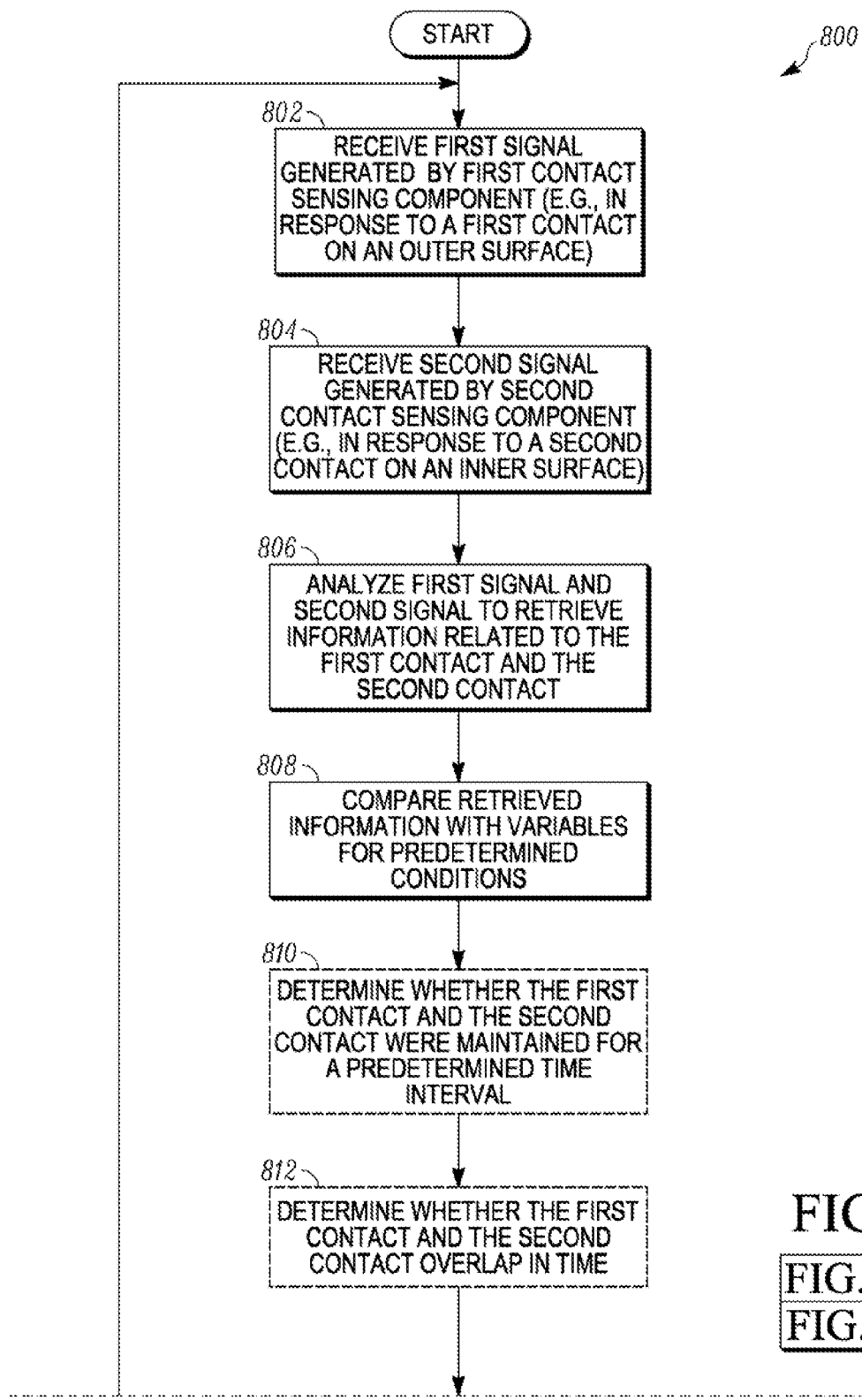
FIG. 8 is a flow diagram depicting contact-based control of functions associated with an electronic device in accordance with some embodiments.
Figure 8B:
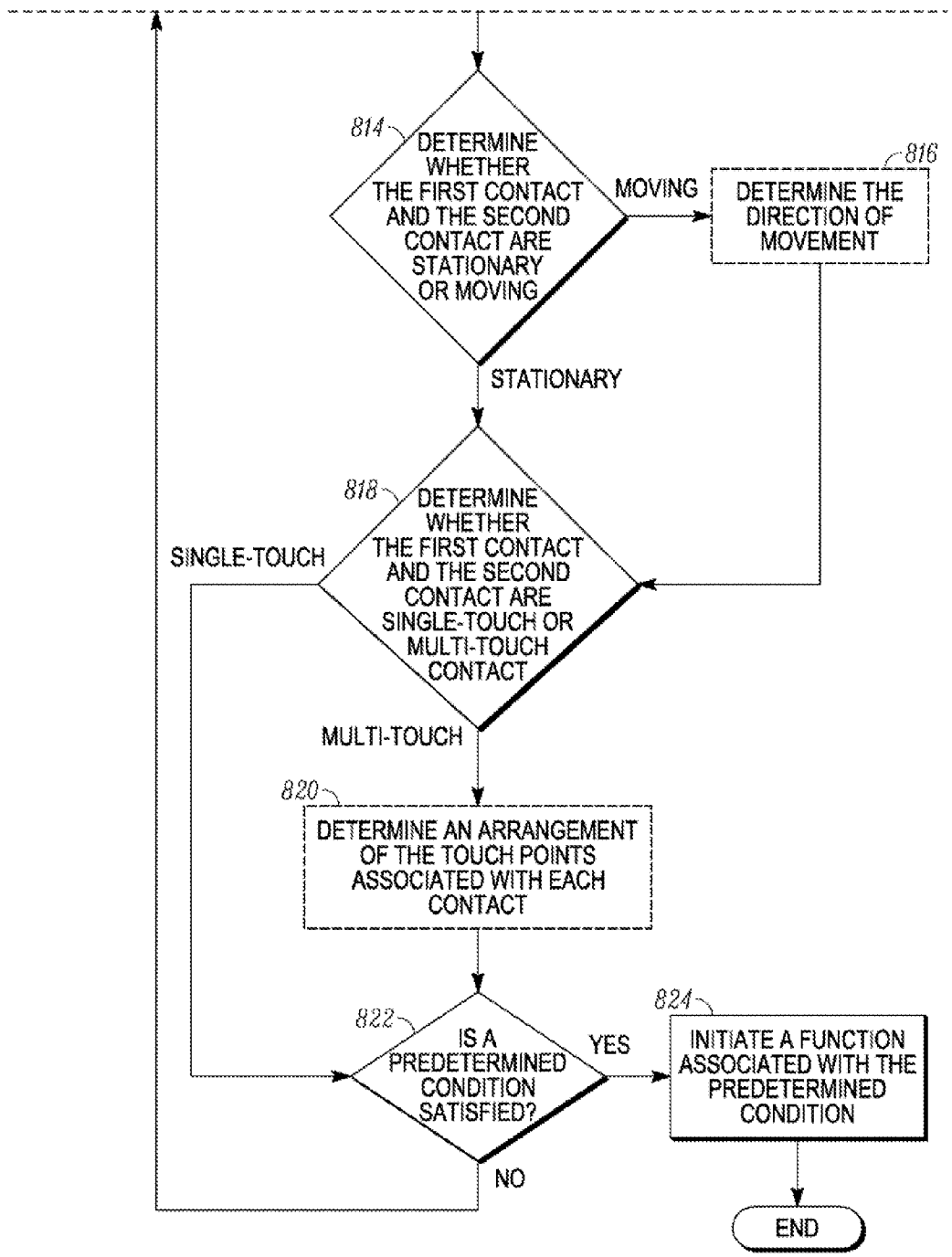

FIG. 8 is a flowchart of a method 800 for controlling functions associated with a touch-sensitive device capable of being worn by a user (such as the wearable device 100 as shown in FIG. 1), the touch-sensitive device having a substrate that includes an outside surface and an inside surface opposite from the outside surface. More particularly, the method 800 relates to detecting user input based on tactile interactions or contacts made with the outside surface and/or the inside surface of the touch-sensitive device while the device is being worn by the user, and in response to the detected contact(s), initiating a predefined function associated with the touch-sensitive device. The tactile interactions may include gestures, movements, touches, and/or any other form of contact made with the wearable touch-sensitive device using any portion of a hand, including one or more finger(s) and/or a thumb, a wrist, an arm, an ankle, and/or any other body part(s). In some embodiments, the tactile interactions may include natural or intuitive motions that can be performed by the user without looking at the wearable device. The touch-sensitive device may further include a processor (such as the processer 740 as shown in FIG. 7) that is configured to carry out the method steps described herein.

The method 800 begins at step 802 with receipt of a first signal generated by a first contact sensing component (such as the outer sensor 120 as shown in FIGS. 1A, 1B, and 1C) upon detection of a first contact with the outside surface of the touch-sensitive device. Step 804 includes receiving a second signal generated by a second contact sensing component (such as the inner sensor 130 as shown in FIGS. 1A, 1B, and 1C) upon detection of a second contact with the inside surface of the touch-sensitive device. For example, the first signal and the second signal may be received by a processor associated with the touch-sensitive device. The first contact and/or the second contact may be stationary or moving relative to the surface on which the contact is made. In some embodiments, the first contact and the second contact are overlapping in time, and thus, the steps 802 and 804 may also occur contemporaneously.

Step 806 includes analyzing the first signal and the second signal to retrieve information from the received signals. The information retrieved from the first and second signals may be used to determine whether one of several predetermined conditions is satisfied. For example, each predetermined condition may include multiple variables or facets relating to measurements or other data associated with a detected contact. The information retrieved from the received signals may relate to these measurements and data, which may include, for example, which contact sensing component detected each contact, the type of movement detected for each contact, timing information for each contact, the number of touch-points detected for each contact, the arrangement of multi-touch contacts, and/or the direction of any moving contact.

Step 808 includes comparing the information retrieved from the first and second signals with the facets of each predetermined condition. To carry out this comparison, the processor may access a database that stores information related to the variables of each predetermined condition, including a value for each variable of a predetermined condition (e.g., see Table 1).

According to some embodiments, the method 800 may include one or more of steps 810, 812, 814, 816, 818, 820 to determine whether specific variables of a predetermined condition are satisfied. For example, at step 810, the processor determines whether the first and second contacts were each maintained for at least a predetermined time interval based on timing information retrieved from the first and second signals. At step 812, the processor uses the timing information to determine whether the first and second contacts overlap in time or are contemporaneous. At step 814, the processor determines whether each of the first contact and the second contact are moving or stationary based on movement information retrieved from the first and second signals. If one of the contacts is moving, the method 800 moves to step 816, where the processor determines the direction of the moving contact (e.g., clockwise, counterclockwise, or any other direction).

From step 816, the method 800 continues to step 818, where the processor determines whether each of the first contact and the second contact are single-touch or multi-touch contacts based on information retrieved from the first and second signals regarding the number of touch points for each contact. Also, if the determination at step 814 is that both contacts are stationary, the method 800 continues directly to step 818. If the determination at step 818 is that one of the contacts has more than one touch point, the method 800 continues to step 820, where the processor determines how the multiple touch points are arranged (e.g., proximately placed, distantly placed, or arranged in a grip hold) based on arrangement information retrieved from the first and second signals.

From step 820, the method 800 moves to step 822, where the processor determines whether a predetermined condition is satisfied by the first and second contacts based on the information retrieved from the first and second signals. Also, if the determination at step 818 is that both contacts are single-touch contacts, the method 800 continues directly to step 822. As should be appreciated, the method 800 is not limited to the examples given herein with respect to steps 810, 812, 814, 816, 818, 820, as indicated by the dashed lines in FIG. 8. Any of a number of other criteria may be used to determine whether a predetermined condition is satisfied, as described herein.

At step 822, a determination is made based on the outcomes of steps 810, 812, 814, 816, 818, 820 regarding whether one of the predetermined conditions is satisfied by detection of the first contact and the second contact. For example, if each of the variables of a predetermined condition is satisfied by detection of the first and second contacts, then a positive determination (e.g., "Yes") is made. Upon a positive determination at step 822, the method 800 continues to step 824, where the touch-sensitive device initiates a function associated with the satisfied predetermined condition. On the other hand, if none of the predetermined conditions are satisfied, then a negative determination (e.g., "No") is made, and the method 800 returns to the beginning.

One example of carrying out steps 806, 808, 822 may include determining that the predetermined condition is satisfied upon determining that the first signal corresponds to detection of stationary contacts at multiple locations along a majority of the outside surface, and determining that the second signal corresponds to detection of stationary contact at at least one location on the inside surface. For example, the first signal may be generated by the first contact sensing component in response to the user's hand grabbing and curving around the outside surface of the touch-sensitive device. At substantially the same time, the second signal may be generated by the second contact sensing component in response to the user's hand applying enough pressure on the outside surface to cause the inside surface to contact the user's wrist.

As yet another example of the analyzing and determining in steps 806, 808, 822, the processor may determine that the predetermined condition is satisfied upon determining that the first signal corresponds to detection of stationary contact at at least two locations on the outside surface, the at least two locations being a predetermined distance apart, and determining that the second signal corresponds to detection of moving contact at at least one location on the inside surface. For example, the first signal may be generated by the first contact sensing component in response to the user placing two components of the user's hand (e.g., an index finger and a thumb) at least the predetermined distance apart on the outside surface of the touch-sensitive device. And at substantially the same time, the second signal may be generated by the second contact sensing component in response to the user applying sufficient pressure to the device while rotating the device around the wrist on which the device is being worn, so that the inside surface of the device contacts (e.g., slides around) the wrist.

Still another example for carrying out steps 806, 808, 822, the processor may determine that the predetermined condition is satisfied upon determining that the first signal corresponds to detection of moving contact along a portion of the outside surface and determining that the second signal corresponds to detection of stationary contact at at least one location on the inside surface. For example, the first signal may be generated by the first contact sensing component in response to the user sliding one or more fingers around the outside surface of the touch-sensitive device. And at substantially the same time, the second signal may be generated by the second contact sensing component in response to the user applying sufficient pressure on the outside surface to cause the inside surface of the device to contact the wrist around which the device is being worn.

As another example of carrying out steps 806, 808, 822, the processor may determine that the predetermined condition is satisfied upon determining that the first signal corresponds to detection of stationary contact at at least two locations on the outside surface and determining that the second signal corresponds to detection of stationary contact at at least two locations on the inside surface opposite from the at least two locations on the outside surface. For example, the first signal may be generated by the first contact sensing component in response to the user pressing two fingers against a portion of the touch-sensitive device that is close in proximity to an underside of the wrist around which the device is being worn (e.g., near the ulnar artery). And at substantially the same time, the second signal may be generated by the second contact sensing component in response to the user applying enough pressure to the outside surface to cause the inside surface to contact the user's wrist at locations opposite from the locations of the two-finger press.

Several examples of user inputs and/or tactile interactions with the wearable touch-sensitive band are described herein.

However, the wearable touch-sensitive band is not limited the examples described herein and may be able to detect any of a number of different combinations of hand gestures, movements, and/or contacts using the first contact sensing component and/or the second contact sensing component. As an example, other input gestures may include a quick tap of the band (e.g., like a slap on the wrist), a position or orientation of the hand and/or wrist on which the band is being worn, and other intuitive or natural motions.

Thus, it should be clear from the preceding disclosure that the methods and systems described herein allow user-control of one or more functions associated with a wearable touch-sensitive device upon detecting contact-based inputs at at least two sensors respectively disposed in close proximity to two opposite surfaces of the touch-sensitive device, and upon determining that the detected contact-based inputs satisfy a predetermined condition associated with each function, where the contact-based inputs may be stationary contacts and/or moving contacts and may overlapping in time.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A touch-sensitive device capable of being worn by a user, comprising:
    a display screen configured to display graphical information;
    a substrate with an outside surface and an inside surface opposite from the outside surface, wherein the substrate is configured to support the display screen;
    a first contact-sensing component coupled to the substrate and configured to generate a first signal responsive to detecting a first contact with at least a portion of the outside surface;
    a second contact-sensing component coupled to the substrate and configured to generate a second signal responsive to detecting a second contact with at least a portion of the inside surface; and
    a processor configured to interface with the first contact-sensing component and the second contact-sensing component, and to perform operations comprising:
        responsive to determining, based upon an analysis of both the first signal and the second signal, that a predetermined condition is satisfied:
            determining, based on the predetermined condition, a function from a plurality of different functions; and
            initiating the function,
        wherein determining that the predetermined condition is satisfied comprises:
            determining whether the first contact corresponds to a first stationary contact or a first moving contact, wherein determining whether the first contact corresponds to the first moving contact comprises determining a direction of movement of the first contact relative to the outside surface of the substrate; and
            determining whether the second contact corresponds to a second stationary contact or a second moving contact, wherein determining whether the second contact corresponds to the second moving contact comprises determining a direction of movement of the second contact relative to the inside surface of the substrate.

2. The touch-sensitive device of claim 1, wherein the first contact-sensing component comprises:
    an array of discrete touch sensors.

3. The touch-sensitive device of claim 1, wherein the first contact-sensing component comprises:
    a single, continuous touch sensor.

4. The touch-sensitive device of claim 1, wherein the second contact-sensing component comprises:
    an array of discrete touch sensors.

5. The touch-sensitive device of claim 1, wherein the second contact-sensing component comprises:
    a single, continuous touch sensor.

6. The touch-sensitive device of claim 1, wherein the processor is further configured to determine that the first contact and the second contact are each maintained for a predetermined time interval.

7. The touch-sensitive device of claim 1, wherein the first contact-sensing component is part of the display screen, the display screen comprising a touch screen.

8. The touch-sensitive device of claim 7, wherein the touch screen is flexible.

9. The touch-sensitive device of claim 1, further comprising:
    a shield disposed between the first contact-sensing component and the second contact-sensing component, the shield being configured to reduce a detection of the first contact by the second contact-sensing component.

10. The touch-sensitive device of claim 1, further comprising:
    a shield disposed between the first contact-sensing component and the second contact-sensing component, the shield being configured to reduce a detection of the second contact by the first contact-sensing component.

11. A method comprising:
    receiving a first signal generated by a first contact-sensing component of a touch-sensitive device responsive to the first contact-sensing component detecting a first contact with at least a portion of an outside surface of a substrate of the touch-sensitive device, wherein the touch-sensitive device further comprises a display screen that is supported by the substrate and that is configured to display graphical information, and wherein the touch-sensitive device is capable of being worn by a user;
    receiving a second signal generated by a second contact-sensing component of the touch-sensitive device responsive to the second contact-sensing component detecting a second contact with at least a portion of an inside surface of the substrate of the touch-sensitive device, the inside surface being opposite from the outside surface;
    responsive to determining, based upon an analysis of both the first signal and the second signal, that a predetermined condition is satisfied:
        determining, based on the predetermined condition, a function from a plurality of different functions; and
        initiating the function,
    wherein determining whether the predetermined condition is satisfied comprises:

determining that the first contact corresponds to a first stationary contact or a first moving contact, wherein determining whether the first contact corresponds to the first moving contact comprises determining a direction of movement of the first contact relative to the outside surface of the substrate; and determining whether the second contact corresponds to a second stationary contact or a second moving contact, wherein determining whether the second contact corresponds to the second moving contact comprises determining a direction of movement of the second contact relative to the inside surface of the substrate.

12. The method of claim 11, wherein the analysis of both the first signal and the second signal comprises:
   determining that the first signal corresponds to a detection of a respective stationary contact at each of a plurality of locations on the outside surface, and
   determining that the second signal corresponds to a detection of a stationary contact at one or more locations on the inside surface.

13. The method of claim 11, wherein the analysis of both the first signal and the second signal comprises:
   determining that the first signal corresponds to a detection of a respective stationary contact at each of at least two locations on the outside surface, the at least two locations on the outside surface being a predetermined distance apart, and
   determining that the second signal corresponds to a detection of a moving contact at one or more locations on the inside surface.

14. The method of claim 11, wherein the analysis of both the first signal and the second signal comprises:
   determining that the first signal corresponds to a detection of a moving contact along a portion of the outside surface, and
   determining that the second signal corresponds to a detection of a stationary contact at one or more locations on the inside surface.

15. The method of claim 11, wherein the analysis of both the first signal and the second signal comprises:
   determining that the first signal corresponds to a detection of a respective stationary contact at each of at least two locations on the outside surface, and
   determining that the second signal corresponds to a detection of a respective stationary contact at each of at least two locations on the inside surface opposite from the at least two locations on the outside surface.

16. The method of claim 11, wherein the analysis of both the first signal and the second signal comprises determining that the first contact and the second contact are each maintained for a predetermined time interval.

17. The method of claim 11, wherein the first contact and the second contact are overlapping in time.

18. The method of claim 11, wherein the analysis of both the first signal and the second signal comprises:
   determining that at least one of the first contact or the second contact is associated with a value greater than a threshold value, the threshold value being associated with a detection of the first contact by the second contact-sensing component or a detection of the second contact by the first contact-sensing component.

19. The touch-sensitive device of claim 1, wherein the first contact and the second contact are overlapping in time.

20. The touch-sensitive device of claim 1, wherein at least one of the first contact-sensing component or the second contact-sensing component is at least partially integrated into the substrate.

21. The method of claim 11, wherein at least one of the first contact-sensing component or the second contact-sensing component is at least partially integrated into the substrate.

22. The method of claim 11, wherein the first contact-sensing component is part of the display screen, the display screen comprising a touch screen.

23. A non-transitory computer usable storage medium comprising computer-readable program code that, when executed, causes a processor to perform operations comprising:
   receiving a first signal generated by a first contact-sensing component of a touch-sensitive device responsive to the first contact-sensing component detecting a first contact with at least a portion of an outside surface of a substrate of the touch-sensitive device, wherein the touch-sensitive device further comprises a display screen that is supported by the substrate and that is configured to display graphical information, and wherein the touch-sensitive device is capable of being worn by a user;
   receiving a second signal generated by a second contact-sensing component of the touch-sensitive device responsive to the second contact-sensing component detecting a second contact with at least a portion of an inside surface of the substrate of the touch-sensitive device, the inside surface being opposite from the outside surface;
   responsive to determining, based upon an analysis of both the first signal and the second signal, that a predetermined condition is satisfied:
      determining, based on the predetermined condition, a function from a plurality of different functions; and
      initiating the function,
   wherein determining whether the predetermined condition is satisfied comprises:
      determining that the first contact corresponds to a first stationary contact or a first moving contact, wherein determining whether the first contact corresponds to the first moving contact comprises determining a direction of movement of the first contact relative to the outside surface of the substrate; and
      determining whether the second contact corresponds to a second stationary contact or a second moving contact, wherein determining whether the second contact corresponds to the second moving contact comprises determining a direction of movement of the second contact relative to the inside surface of the substrate.

* * * * *